US006490350B2

(12) United States Patent
McDuff et al.

(10) Patent No.: US 6,490,350 B2
(45) Date of Patent: *Dec. 3, 2002

(54) MONITORING SYSTEM FOR TELEPHONY RESOURCES IN A CALL CENTER

(75) Inventors: Richard McDuff, Colorado Springs, CO (US); Wesley Jon Atkinson, Woodland Park, CO (US); Donald L. Ravenscroft, Colorado Springs, CO (US); Gopi Shankar, Colorado Springs, CO (US); Craig Kaley, Parker, CO (US); Craig Alan Baxter, Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,546

(22) Filed: Sep. 30, 1997

(65) Prior Publication Data

US 2001/0012356 A1 Aug. 9, 2001

(51) Int. Cl.[7] ............................................. H04M 3/00
(52) U.S. Cl. ...................... 379/265.06; 379/265.01; 379/265.02; 379/266.01; 379/265.08; 379/266.03
(58) Field of Search ................. 379/34, 38, 201, 379/207, 265, 266, 309, 338, 210, 211, 268, 265.01, 265.02, 265.03, 265.05, 214.01, 218.01, 265.06, 265.08, 265.1, 265.12, 265.14, 266.01, 266.03, 266.06; 395/200.34, 200.36, 200.57; 370/351, 352, 389, 401

(56) References Cited

U.S. PATENT DOCUMENTS 3,643,034 A 2/1972 Burns et al. ............... 179/27 D
4,455,455 A 6/1984 Little ..................... 379/203.01
4,510,351 A * 4/1985 Costello et al. ............ 179/27 D (List continued on next page.)

FOREIGN PATENT DOCUMENTS

| CA | 2041882 | 5/1991 | ............ H04Q/0/01 |
| EP | 0 340 665 A2 | 11/1989 | ............ H04M/3/36 |
| EP | 0 535 270 A1 | 4/1991 | ............ H04M/3/50 |
| EP | 0647050 | 4/1995 | |
| WO | 96/16911 | 11/1996 | |

OTHER PUBLICATIONS

Foard, C.F., "Teaming Switches and Computers for Customer Applications", AT&T Technology, vol. 6, No. 4, Jan. 1, 1991, pp. 32–38, XP000291998.

"Centre Vu™ Solutions Management Tools for Enhancing Call Center Performance", Lucent Technologies, 1997.

*Engineering and Operations in the Bell System*, Bell Telephone Laboratories, Copyright 1977, pp. 503–504.

Kanzow J et al: "Dienste und netze fuer die multimedia–kommunikation"; IT+TI Informationstechnik und technische informatik; vol. 36, No. 4/05, pp. 92–95; XP000468540.

Primary Examiner—Allan Hoosain

(57) ABSTRACT

An automated monitoring system monitors telephone resources in a call center. The call center may include agent stations at which agents are stationed to handle calls. A monitoring server monitors calling activity by the agents to maintain state information about the agents and to gather statistics about the calling activity of the agents. These statistics are forwarded to a client program run on a workstation or other type of computer system. The client program provides a graphical user interface and depicts the state information about the agents as part of the interface. The graphical user interface may also display statistics regarding the calling activity of agents, agent supervisors, business clients of the call center, and the call center in aggregate.

45 Claims, 21 Drawing Sheets

U.S. PATENT DOCUMENTS

| | | | |
|---|---|---|---|
| 4,782,521 A | 11/1988 | Bartlett et al. | 379/354 |
| 4,797,911 A | 1/1989 | Szlam et al. | 379/67 |
| 4,829,563 A | 5/1989 | Crockett et al. | 379/309 |
| 4,837,799 A | 6/1989 | Prohs et al. | 379/224 |
| 4,881,261 A | 11/1989 | Oliphant et al. | 379/215 |
| 4,894,857 A | 1/1990 | Crockett et al. | 379/67.1 |
| 4,896,345 A | 1/1990 | Thorne | 379/67 |
| 5,097,528 A | 3/1992 | Gursahaney et al. | 379/88.21 |
| 5,099,510 A | 3/1992 | Blinken, Jr. et al. | 379/202.01 |
| 5,101,425 A * | 3/1992 | Darland et al. | 379/34 |
| 5,113,380 A | 5/1992 | Levine | 368/10 |
| 5,155,763 A | 10/1992 | Bigus et al. | 379/113 |
| 5,164,983 A | 11/1992 | Brown et al. | 379/265.03 |
| 5,214,688 A | 5/1993 | Szlam et al. | 379/67 |
| 5,226,120 A | 7/1993 | Brown et al. | 709/224 |
| 5,247,569 A | 9/1993 | Cave | 379/113 |
| 5,270,919 A | 12/1993 | Blake et al. | 370/400 |
| 5,289,368 A | 2/1994 | Jordan et al. | 705/8 |
| 5,309,504 A | 5/1994 | Morganstein | 379/67.1 |
| 5,309,505 A | 5/1994 | Szlam et al. | 379/88 |
| 5,393,964 A | 2/1995 | Hamilton et al. | 235/381 |
| 5,444,774 A | 8/1995 | Friedes | 379/266.01 |
| 5,457,738 A | 10/1995 | Sylvan | 379/93.23 |
| 5,463,731 A | 10/1995 | Diec et al. | 345/777 |
| 5,465,286 A | 11/1995 | Clare et al. | 379/32.04 |
| 5,467,391 A * | 11/1995 | Donaghue, Jr. et al. | 379/265 |
| 5,483,586 A | 1/1996 | Sussman | 379/218.01 |
| 5,491,797 A | 2/1996 | Thompson et al. | 709/204 |
| 5,499,291 A | 3/1996 | Kepley | 379/265.06 |
| 5,506,897 A | 4/1996 | Moore et al. | 379/220.01 |
| 5,511,117 A | 4/1996 | Zazzera | 379/265.03 |
| 5,517,566 A * | 5/1996 | Smith et al. | 379/265 |
| 5,519,773 A | 5/1996 | Dumas et al. | 379/265.05 |
| 5,535,256 A * | 7/1996 | Maloney et al. | 379/34 |
| 5,542,350 A | 8/1996 | Reynolds et al. | 101/228 |
| 5,546,449 A | 8/1996 | Hogan et al. | 379/202.01 |
| 5,577,112 A | 11/1996 | Cambray et al. | 379/265.03 |
| 5,602,730 A | 2/1997 | Coleman et al. | 705/15 |
| 5,621,789 A * | 4/1997 | McCalmont et al. | 379/265 |
| 5,623,540 A * | 4/1997 | Morrison et al. | 379/115 |
| 5,625,683 A | 4/1997 | Nazanin et al. | 379/355.06 |
| 5,675,630 A | 10/1997 | Beatty | 455/551 |
| 5,675,637 A | 10/1997 | Szlam et al. | 379/142.17 |
| 5,696,811 A | 12/1997 | Maloney et al. | 379/265.07 |
| 5,703,943 A * | 12/1997 | Otto | 379/265 |
| 5,710,887 A | 1/1998 | Chellaiah et al. | 705/26 |
| 5,715,307 A * | 2/1998 | Zazzera | 379/265 |
| 5,751,795 A * | 5/1998 | Hassler et al. | 379/93.17 |
| 5,757,904 A * | 5/1998 | Anderson | 379/265 |
| 5,761,502 A * | 6/1998 | Jacobs | 395/614 |
| 5,781,735 A * | 7/1998 | Southard | 395/200.54 |
| 5,784,452 A | 7/1998 | Carney | 379/265.06 |
| 5,790,635 A | 8/1998 | Dezonno | 379/32.04 |
| 5,790,798 A | 8/1998 | Beckett, II et al. | 709/224 |
| 5,815,554 A | 9/1998 | Burgess et al. | 379/90.01 |
| 5,815,566 A | 9/1998 | Ramot et al. | 379/210.01 |
| 5,818,907 A | 10/1998 | Maloney et al. | 379/32.01 |
| 5,822,400 A | 10/1998 | Smith | 379/32.02 |
| 5,838,682 A * | 11/1998 | Dekelbaum et al. | 370/401 |
| 5,848,356 A | 12/1998 | Jambhekar et al. | 455/403 |
| 5,850,433 A | 12/1998 | Rondeau | 379/218.01 |
| 5,854,825 A | 12/1998 | Mukaihara et al. | 379/309 |
| 5,864,616 A | 1/1999 | Hartmeier | 379/265.03 |
| 5,867,495 A | 2/1999 | Elliott et al. | 370/352 |
| 5,884,032 A * | 3/1999 | Bateman et al. | 395/200.34 |
| 5,894,512 A | 4/1999 | Zenner | 379/265 |
| 5,901,209 A | 5/1999 | Tannenbaum et al. | 379/142 |
| 5,910,983 A | 6/1999 | Dezonno et al. | 379/266 |
| 5,915,012 A | 6/1999 | Miloslavsky | 379/265.02 |
| 5,926,538 A | 7/1999 | Deryugin et al. | 379/265.03 |
| 5,933,492 A * | 8/1999 | Turovski | 379/265 |
| 5,946,375 A | 8/1999 | Pattison et al. | 379/112.01 |
| 5,946,386 A * | 8/1999 | Rogers et al. | 379/265 |
| 5,948,632 A | 9/1999 | Iyob et al. | 435/22 |
| 5,970,134 A | 10/1999 | Highland et al. | 379/265.02 |
| RE36,416 E * | 11/1999 | Szlam et al. | 379/88.09 |
| 5,991,390 A * | 11/1999 | Booton | 379/265 |
| 5,999,965 A * | 12/1999 | Kelly | 709/202 |
| 6,032,184 A | 2/2000 | Cogger et al. | 709/223 |
| 6,055,308 A | 4/2000 | Miloslavsky et al. | 379/265.03 |
| 6,058,163 A | 5/2000 | Pattison et al. | 379/265.06 |
| 6,115,040 A * | 9/2000 | Bladow et al. | 345/335 |
| 6,134,318 A | 10/2000 | O'Neil | 379/266.01 |
| 6,137,862 A | 10/2000 | Atkinson et al. | 379/32.01 |
| 6,141,412 A | 10/2000 | Smith et al. | 379/265.14 |
| 6,148,065 A | 11/2000 | Katz | 379/88.2 |
| 6,148,074 A | 11/2000 | Milosalavsky | 379/242 |
| 6,192,121 B1 | 2/2001 | Atkinson et al. | 379/265.01 |

* cited by examiner

Event Types For CTI Server /126

| | |
|---|---|
| EventAgentLogin /128 | EventAttachedDataChanged /158 |
| EventAgentLogout /130 | EventError /160 |
| EventAgentReady /132 | EventEstablished /162 |
| EventAgentNotReady /134 | EventOffHook /164 |
| EventAgentBusy /136 | EventOnHook /166 |
| EventAgentNotBusy /138 | EventReleased /168 |
| EventCallAbandonedQueue /140 | EventRetrieved /170 |
| EventCallEnteredQueue /142 | EventRinging /172 |
| EventCallForwardCancel /144 | EventAddressAllocated /174 |
| EventCallForwardSet /146 | EventRouteRequest /176 |
| EventUserEvent /148 | EventServerDisconnected /178 |
| EventConferenced /150 | EventTransferred /180 |
| EventDigitsCollected /152 | EventMailboxLogin /181 |
| EventDialing /154 | EventMailboxLogout /183 |
| EventAddressFreed /156 | EventVoiceFileOpened /185 |
| | EventVoiceFileClosed /187 |

FIG. 8

Attributes Of Agent Object /182

| | |
|---|---|
| AgentID /190 | AvailableTime /230 |
| SupID /192 | UnavailableTime /232 |
| AgentState /200 | OnCallTime /234 |
| MonitoringSystemState /202 | CallWorkTime /236 |
| InboundCalls [ ] /204 | ErrorTime /238 |
| CallCount /206 | UnknownTime /240 |
| TotalCalls [ ] /208 | CurrentTime /242 |
| CallType /210 | RefTime /244 |
| BusCode /212 | ResetTime /246 |
| OnCall /214 | StateChangeTimeStr /248 |
| Pad /216 | TotalLoginSecs /250 |
| LoginTime /218 | TotalAvailableSecs /252 |
| LogoutTime /220 | TotalUnavailableSecs /254 |
| StateChangeTime /222 | TotalOnCallSecs /256 |
| EventEstablishedTime /224 | TotalInboundCallSecs [ ] /258 |
| EventReleasedTime /226 | TotalOutboundCallSecs /260 |
| EventReadyTime /228 | TotalInternalCallSecs /262 |

FIG. 9A

Attributes Of Agent Object

| | |
|---|---|
| TotalConsultCallSecs | 264 |
| TotalUnknownCallSecs | 266 |
| TotalCallWorkSecs | 268 |
| TotalErrorSecs | 270 |
| TotalUnknownSecs | 272 |
| TalkTime | 274 |
| TotalTalkTime [ ] | 276 |
| AvgTalkTime [ ] | 278 |
| AvgAllTalkTime | 280 |
| AvgWorkTime | 282 |
| AvgHandlingTime | 284 |
| GhostCalls | 286 |
| Hangups | 288 |
| CallsHandled | 290 |
| InboundCallsHandled [ ] | 292 |
| OutboundCallsHandled | 294 |
| InternalCallsHandled | 296 |
| ConsultCallsHandled | 298 |
| UnknownCallsHandled | 300 |
| Skills | 302 |
| NewAgent | 304 |

FIG. 9B

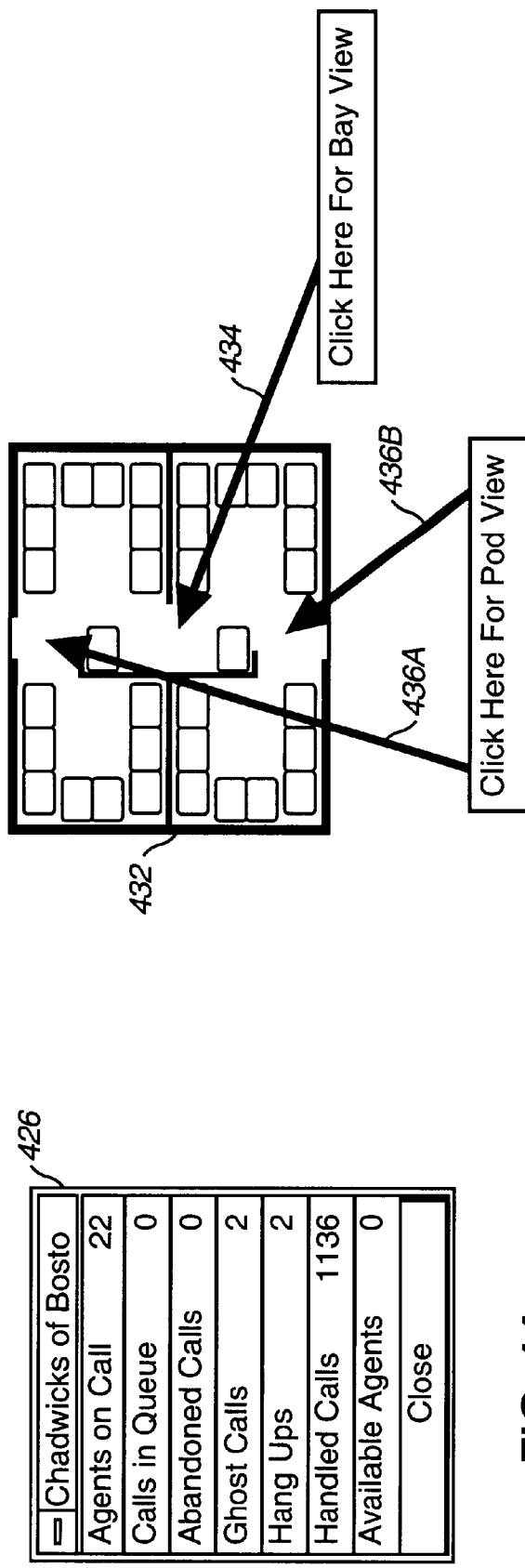

MONITORING SYSTEM FOR TELEPHONY RESOURCES IN A CALL CENTER

TECHNICAL FIELD

The present invention relates generally to telecommunications systems, and more particularly, to a monitoring system for telephony resources in a call center.

BACKGROUND OF THE INVENTION

A typical call center includes a number of agents who field inbound telephone calls and place outbound telephone calls. Each agent has an associated station that includes a personal computer or workstation, a phone pad and a head set. The agent may place outbound sales calls to potential customers or field inbound calls (such as 800 number calls) from potential customers. The agents are organized into groups and have associated supervisors, who are responsible for managing and overseeing the agents. Each agent may receive or place calls for different business clients.

One of the difficulties encountered in such a call center is the difficulty of monitoring the phone activity of the agents. It is difficult for a supervisor to obtain useful information about the activities of agents in a timely fashion. Such a lack of information makes it difficult for a supervisor to properly manage the agents and increase the profitability of the call center. In general, a supervisor must perform manual analysis and calculation to obtain useful data regarding agent performance.

SUMMARY OF THE INVENTION

The present invention addresses the limitations of the prior art by providing a computerized monitoring system for monitoring telephony resources in a call center. The monitoring system may gather status information and statistics regarding the calling activity of agents within the call center. The monitoring system may display the status information and statistics as part of a graphical user interface. This graphical user interface may include textual and graphical information and serves to display the status information and statistics in a useful and intuitive format.

In accordance with a first aspect of the present invention, a call center includes agent stations to facilitate agents handling calls. Each agent station includes telephony resources through which the agents may handle calls. The call center may also include a monitor for monitoring calling activity of the agents and for producing statistics regarding the calling activity of the agents. A computer system is provided that runs a program for receiving the statistics from the monitor and displays the statistics on a display device.

In accordance with another aspect of the present invention, a computer-implemented method is practiced in a call center that has agents who handle calls. A monitor is provided for monitoring calling activity by the agents. The monitor also gathers statistics regarding the calling activity of the agents. The statistics are passed to an application program on a computer system that displays the statistics on the display device.

In accordance with a further aspect of the present invention, a telecommunications system includes agent stations where agents are stationed to handle calls. Each agent station includes telephony resources for handling calls. The telecommunications system includes a switching mechanism for routing calls and generating raw data regarding the calls. A computer/telephony integration server is provided in the system for receiving the raw data from the switching mechanism and generating events about calling activity based on the raw data. The events are passed to a monitoring server that generates statistics regarding calling activity of the agents. The statistics may be passed to a program running on a workstation. This program may generate output that includes at least some of the statistics.

BRIEF DESCRIPTION OF THE DRAWINGS

A preferred embodiment of the present invention will be described below relative to the following figures.

FIG. 8 lists event types for event messages that are output by the CTI server.

FIGS. 9A and 9B list attributes of agent objects used in the preferred embodiment of the present invention.

FIG. 14 depicts a pop-up window that displays information about a business client.

FIG. 15 depicts hot spots for navigating to display a bay view or a pod view.

FIG. 16 is a screen shot that depicts a window produced by the monitoring system client where a bay view is displayed that contains call statistics.

FIG. 19 is a screen shot that shows a window produced by the monitoring system client where a supervisor view is displayed.

DETAILED DESCRIPTION OF THE INVENTION

The preferred embodiment of the present invention provides an automated monitoring system for telephony resources in a call center. The call center includes a computer/telephony integration (CTI) monitoring server (CTIMS) that gathers statistics regarding agent calling activity and maintains state information about agents. The statistics are passed to a client application program that displays information regarding agent activities and call statistics via an intuitive user interface. The user interface shows the physical layout of the call center and displays useful information about the agents' calling activities. The client application program may provide different views of the call center. Specifically, the client application program may display the entire call center, a single bay of the call center or a single pod of the call center.

The user interface of the client application program displays information regarding each agent, including agent name, average handling time (AHT), average work time (AWT), and average talk time (ATT). Information regarding how may calls an agent has handled relative to a particular business client is also maintained. Graphical information is displayed to indicate whether an agent is available, unavailable, working on a call or is in an error or an unknown state.

CTIMS provides an automated way to gather useful statistics for a supervisor or other manager within the call center. CTIMS performs classification of statistical data to provide reports and formats that are useful to a supervisor. As CTIMS is completely automated, there is no need for a supervisor to manually classify or manipulate data to obtain useful information.

Figure 1:
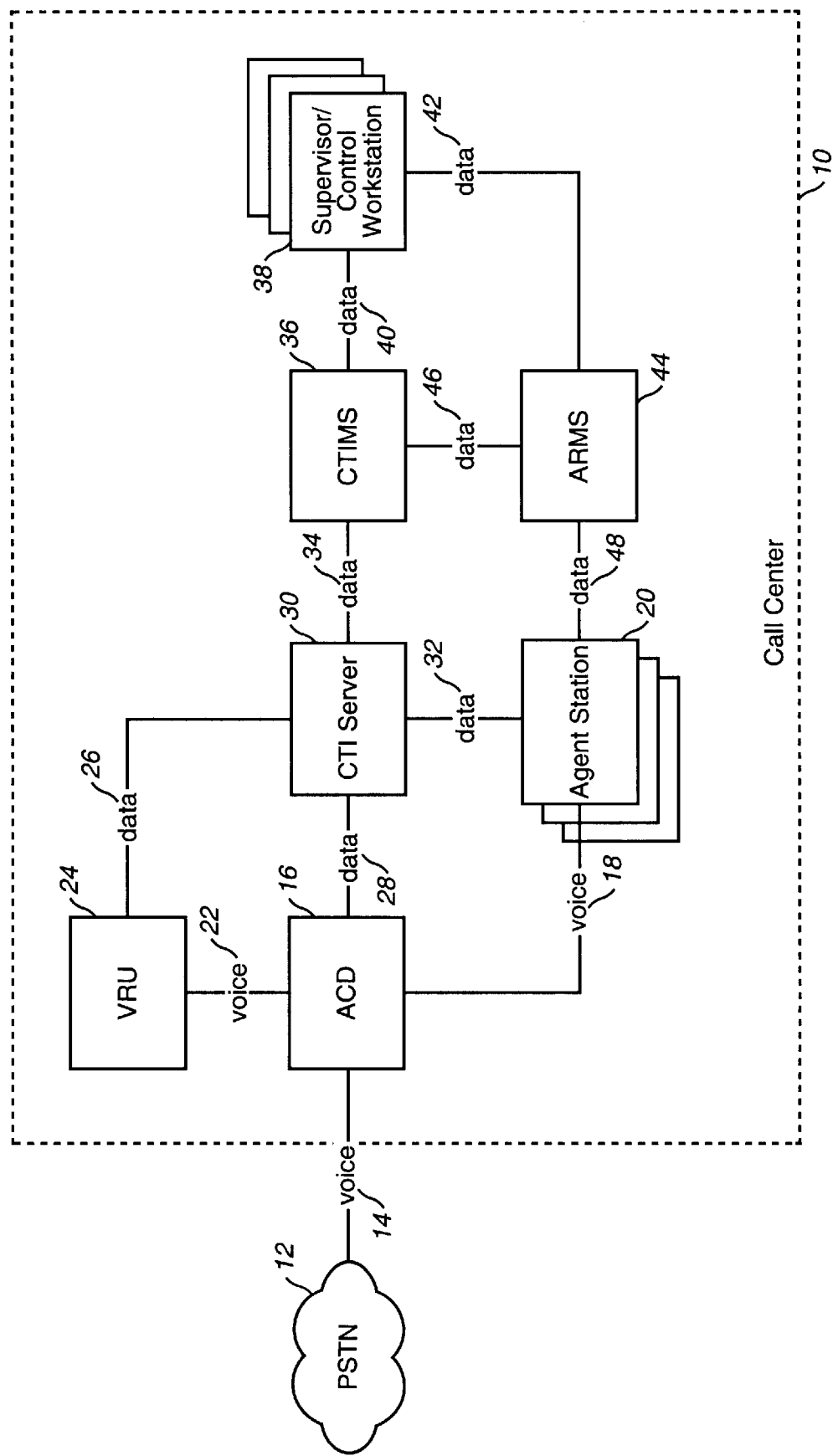
FIG. 1 is a block diagram of a portion of a telecommunications system that is suitable for practicing the preferred embodiment of the present invention.

FIG. 1 is a block diagram that illustrates a portion of a telecommunications network that is suitable for practicing the preferred embodiment of the present invention. The telecommunications network includes a call center 10 that is connected to a public switched telephone network (PSTN) 12 via a voice trunk 14. Those skilled in the art will appreciate that the call center 10 may also be alternatively connected to other types of networks from which calls may originate. The call center 10 includes an automatic call distributor (ACD) 16 or other switching mechanism for distributing incoming calls within the call center. The ACD 16 is connected via voice trunk 18 to agent stations 20. These agent stations 20 include a workstation or personal computer, a phone pad and a head set. Agents are stationed at the stations 20 and utilize the resources contained therein to process calls. The ACD 16 is also connected via a voice trunk 22 to a voice response unit (VRU) 24. The VRU 24 automates call processing. The VRU 24 may be used to collect information such as account numbers, credit card numbers and service requests from callers. The VRU 24 is connected to a computer/telephony integration (CTI) server 30 via a data link 26. The CTI server 30 extracts call data from the ACD 16. In particular, the CTI server 30 abstracts raw call data from the ACD 16 into useful statistical data. The CTI server 30 also distributes data in the form of events. The CTI server 30 may run as a separate process on a dedicated computer system. A suitable CTI server is the T Server produced by Genesys Labs of San Bruno, Calif. The CTI server 30 is connected to the ACD 16 via data link 28 and is also connected to the agent stations 20 via a data link 32.

CTI monitoring server (CTIMS) 36 is connected to the CTI server 30 via data link 34. CTIMS 36 may be implemented on a dedicated computer or on a shared computer. CTIMS 36 serves to compile statistical data that is collected from the CTI server 30 into useful data for presentation and management at the supervisor/control workstations 38. This data is utilized by the monitoring system client 51 of the preferred embodiment of the present invention, as will be described in more detail below. CTIMS 36 registers with the CTI server 30 to receive all events that are output by the CTI server 30. Examples of events that are output by the CTI server 30 include events indicating calls received, calls routed, calls answered, and calls disconnected. These events will be discussed in more detail below. CTIMS 36 categorizes the events into groups, such as by agent, by agent group, by call center, by business type and the like. CTIMS 36 also calculates certain statistics, such as average call handling times.

CTIMS 36 is connected to an automated resource management system (ARMS) 44 via data link 46. ARMS 44 provides management of resource data for the call center. ARMS 44 is largely a database on a server that contains interfaces for access by CTIMS 36 and supervisor/control workstations 38.

It should be appreciated that data links 26, 32, 34, 40, 42, and 48 may all be implemented as local area network (LAN) connections. A suitable LAN is an Ethernet LAN.

Figure 2:
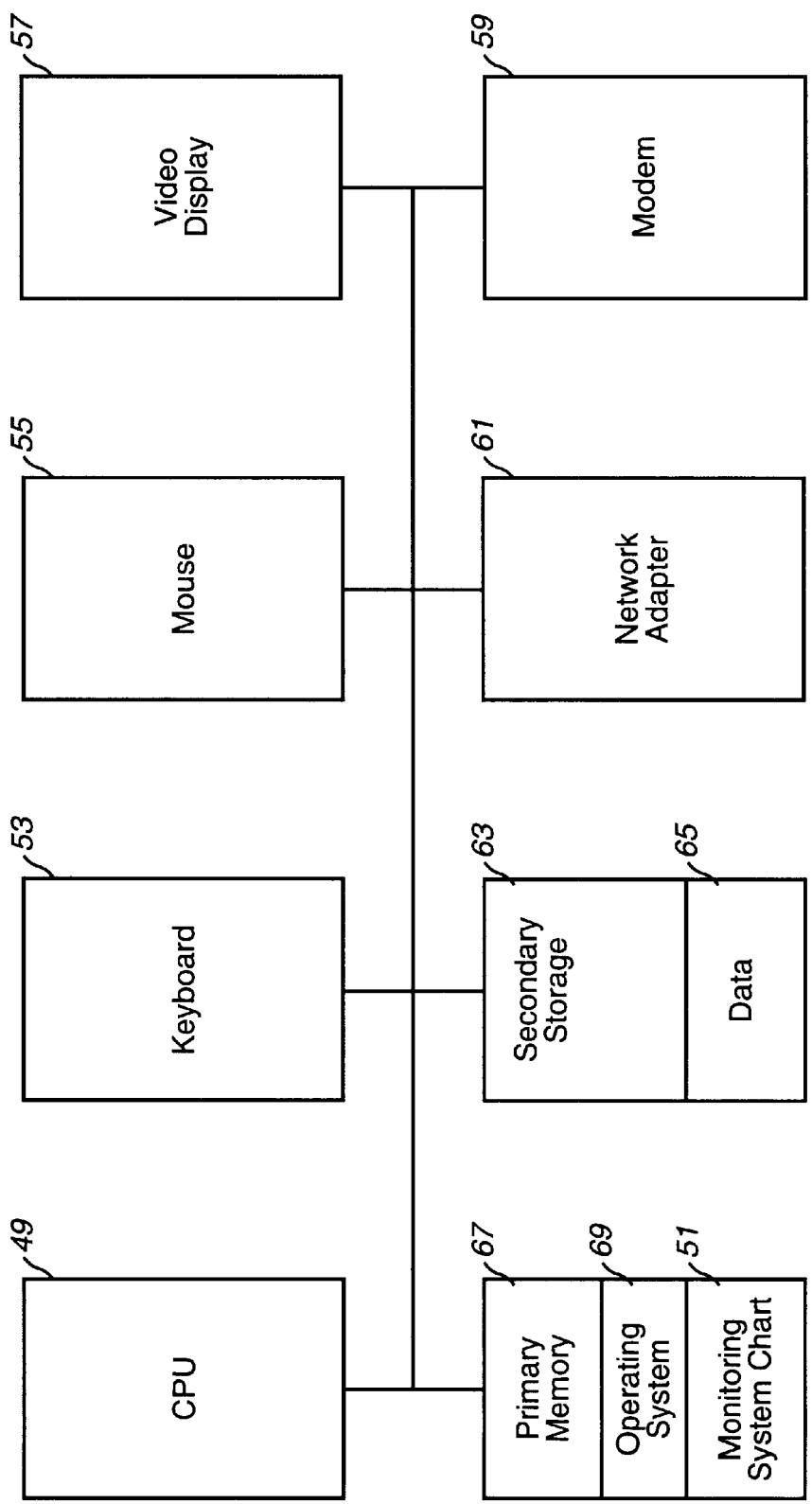
FIG. 2 is a block diagram that illustrates the supervisor/control workstation of FIG. 1 in more detail.

The supervisor/control workstations 38 are the personal computers or workstations that are used by agent supervisors. FIG. 2 depicts the format of a suitable supervisor/control workstation 38 for practicing the preferred embodiment of the present invention. The workstation 38 includes a central processing unit (CPU) 49 for overseeing operation of the workstation. The workstation 38 may also include a number of peripheral devices, including a keyboard 43, a mouse 55 and a video display 57. A modem 59 may be included for enabling the workstation 38 to communicate with remote computing resources over conventional telephone lines. A network adapter 61 may be included to enable the workstation 38 to be connected to a local area network. The workstation 38 includes both primary memory 67 and secondary storage 63. The primary memory 67 may hold a number of different types of data and programs. These programs may include an operating system 69 and a monitoring system client 51 that is responsible for providing a graphical user interface (GUI) to the use of the workstation 38 to display information regarding call center activity. The client application program 51 is known as the monitoring system client. The secondary storage may hold data 65 that is used by the monitoring system client 51.

Those skilled in the art will appreciate that the call center 10 may have a different configuration than that depicted in FIG. 1. Those skilled in the art will also appreciate that the workstation depicted in FIG. 2 is intended to be merely illustrative and not limiting of the present invention. The present invention may be practiced with different call center configurations and different workstation configurations.

Initially, a call originates from the PSTN 12 and is sent over voice trunk 14 to the ACD 16. The ACD 16 decides where the call should be sent. The call is routed over voice trunk 22 to the VRU 24. The VRU 24 includes voice messages for obtaining information from the caller. As was mentioned above, the VRU 24 may collect information such as account numbers, credit card numbers and service requests. The gathered information is passed over data link 26 to the CTI server 30. The CTI server 30, in turn, passes the data to the agent workstation 20 that will be servicing the call. The ACD 16 then switches the call to the agent station 20 that is to handle the call. An application may be run on the agent workstation to provide a screen pop with the information that has been collected by the VRU 24 so that the agent at the agent station 20 has the collected information available. The agent accepts the call and processes it accordingly. Additional information about the caller may be retrieved from ARMS 44.

As was mentioned above, the ACD 16 outputs information regarding the routing and processing calls over data link 28 to the CTI server 30. The CTI server 30 outputs events that are packaged in event structures that are forwarded to CTIMS 36 over the data link 34. These events are processed and categorized by CTIMS 36 and sent over data link 40 to the monitoring system client 51 at the supervisor/control workstations 38. The monitoring system client 51 uses the information from CTIMS 36 to generate a GUI to help a supervisor monitor activity within the call center.

Figure 3:
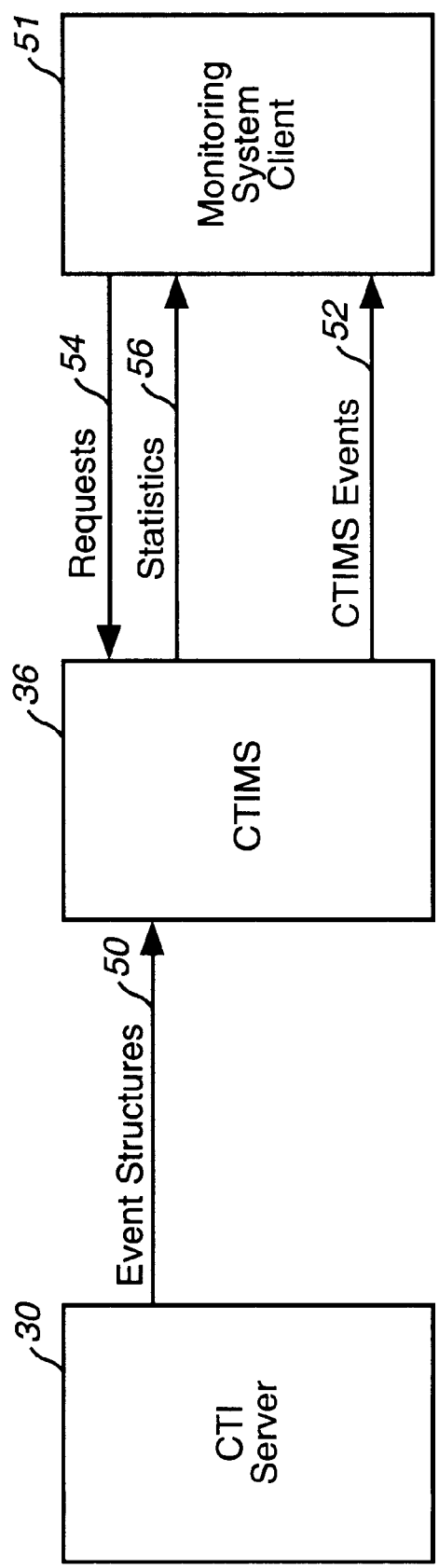
FIG. 3 is a block diagram that depicts the data flow between the computer/telephony integration (CTI) server, the CTI monitoring server (CTIMS) and a client application program.

FIG. 3 depicts the data flow between the CTI server 30, CTIMS 36 and the monitoring system client 51 that is run on the supervisor/control workstation 38. The CTI server 30 outputs event structures 50 that encapsulate information about events to parties that have registered to receive the events. CTIMS 36 registers to receive such events. It should be appreciated that multiple instances of the client application program may be concurrently running on separate supervisor/control workstations and that the events output by the CTI server 30 are output to each of the instances. CTIMS 36 processes the event structure 50 to extract relevant information and update state statistics maintained therein. Two types of information are communicated between CTIMS 36 and the monitoring system client 51. Each of these types of information has an associated socket (such as found in the UNIX operating system). The first type of information is state change information that indicates a change in the state of an agent. An agent may generally be in one of the following states: unavailable, available, on call, call work, error or unknown. When the agent is in an unavailable state, the agent is not available for processing calls. When the agent is in an available state, the agent is not currently processing a call and is available to process new calls. When the agent is in an on call state, the agent is currently handling a call. When the agent is in an error state, an error has occurred. An agent may also be in an unknown state when the monitoring system is not aware of the agent's current status. An agent may be in the call work state, which indicates that the agent is done processing a call and is working on call data. These calls may be of different call types: an outbound call, a conference call, an internal call or a business call. When an agent changes state, CTIMS 36 sends a state change event 52 (which may be viewed as an event report) to the monitoring system client 51 that identifies the change in state. For example, if an agent changes from being available to unavailable, CTIMS 36 generates an event that is sent to the monitoring system client 51.

CTIMS 36 also provides a second type of information: statistics 56. The statistics 56 are used by the monitoring system client 51 and are displayed as part of the GUI produced by the client application program. For purposes of efficiency, the statistical information is not continuously fed into the monitoring system client 51; rather, the monitoring system client 51 polls CTIMS 36 on a periodic basis (such as every 5 seconds) by sending requests 54 to receive updated statistics 56 from CTIMS. The monitoring system client 51 may request agent statistics regarding agents, supervisor statistics regarding supervisors, business statistics regarding business clients, center statistics regarding the entire call center, and state statistics regarding call states.

Figure 4:
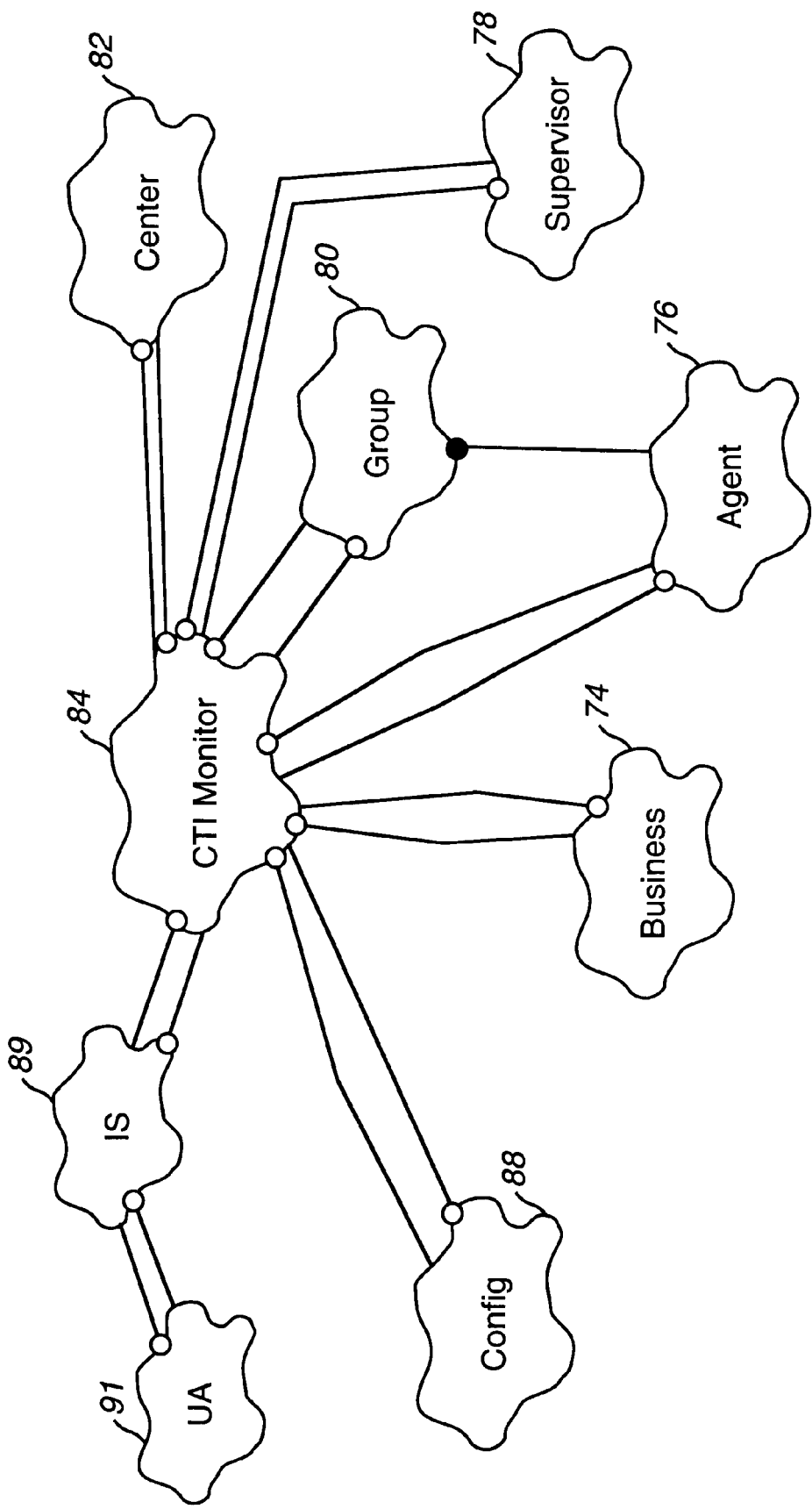
FIG. 4 depicts an object architecture that is suitable for practicing the preferred embodiment of the present invention.

The monitoring system of the preferred embodiment of the present invention adopts an object-oriented architecture. FIG. 4 illustrates a number of the object classes that are utilized within this architecture in a Booch diagram. Business objects are provided for each business client of the call center. Business clients pay for agents of the call center to handle calls on their behalf. The business objects are of the business object class 74. Agent objects are created for each agent within the call center. The agent objects are of the agent object class 76 and hold information regarding specific agents in the call center. A group object class is so provided and serves an abstract base class from which other classes can be derived to maintain statistical information pertaining to a predefined group of agents. Each group has an associated instance of the group object class associated with it. Each call center may have a separate center object of the center object class 82. Each center object holds information regarding the associated call center.

The CTIMonitor object class 84 is for objects that are responsible for receiving and broadcasting information from and to the CTI server 30. This information may include agent user IDs and passwords, directory numbers assigned agents and phone pads used by agents. The config object class 88 holds objects that maintain configuration information. Each socket has an associated instance of the IS ("intelligent service") object class 89. These sockets are used to communicate with instances of the monitoring system client 51 that are of the UA ("user agent") object class 91.

Figure 5:
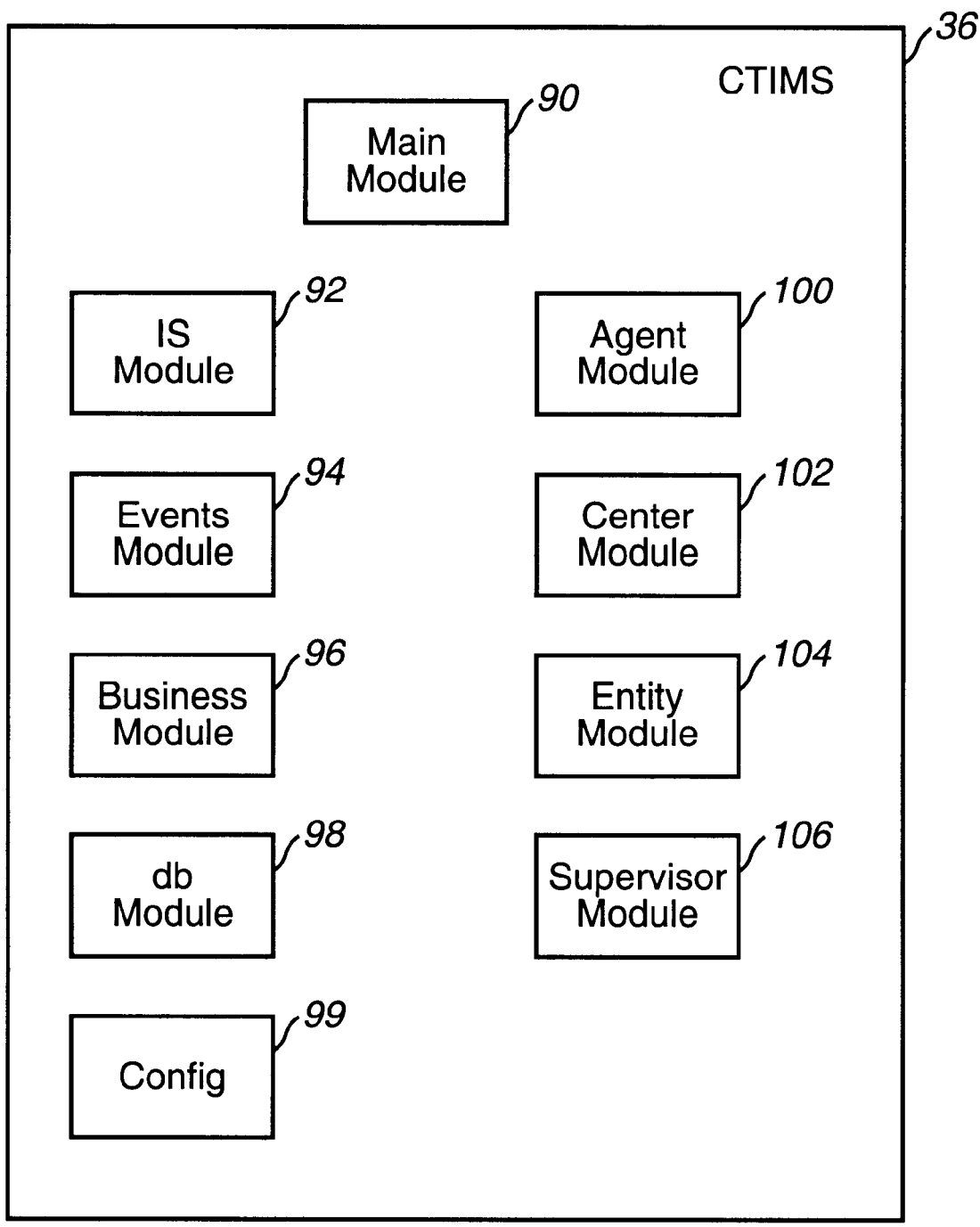
FIG. 5 depicts the modules found in CTIMS.

FIG. 5 shows a logical organization of CTIMS 36. Specifically, CTIMS 36 is divisible into a number of different types of modules. Each module may include multiple objects. The main module 90 is responsible for controlling operations of CTIMS 36. IS module 92 handles socket communications. The events module 94 handles the processing of events received from the CTI server 30. The business module 96 calculates business statistics based upon stored information and events received from the CTI server 30. The database (db) module 98 is responsible for interfacing with the database to get data as needed. The database, as used in this context, refers to that database stored within ARMS 44. The config module 99 is responsible for performing the configuration of CTIMS 36. The agent module 100 gathers and calculates statistics for agents. The center module 102 gathers and calculates statistics for call centers. The entity module 104 is responsible for resetting the statistics. This module may reset the statistics on a daily basis so that the statistics are current only for the given day. The supervisor module 106 gathers and calculates supervisor statistics.

In the preferred embodiment of the present invention, CTIMS 36 is run as a multithreaded process. The main process communicates with the CTI server 30 and the database in ARMS 44. At least one thread is provided to communicate with the client application program. Separate threads process client requests. Specifically, a separate thread is allocated for each client application program request. Another thread may be allocated to perform the resetting that is done by the entity module 104.

Figure 6:
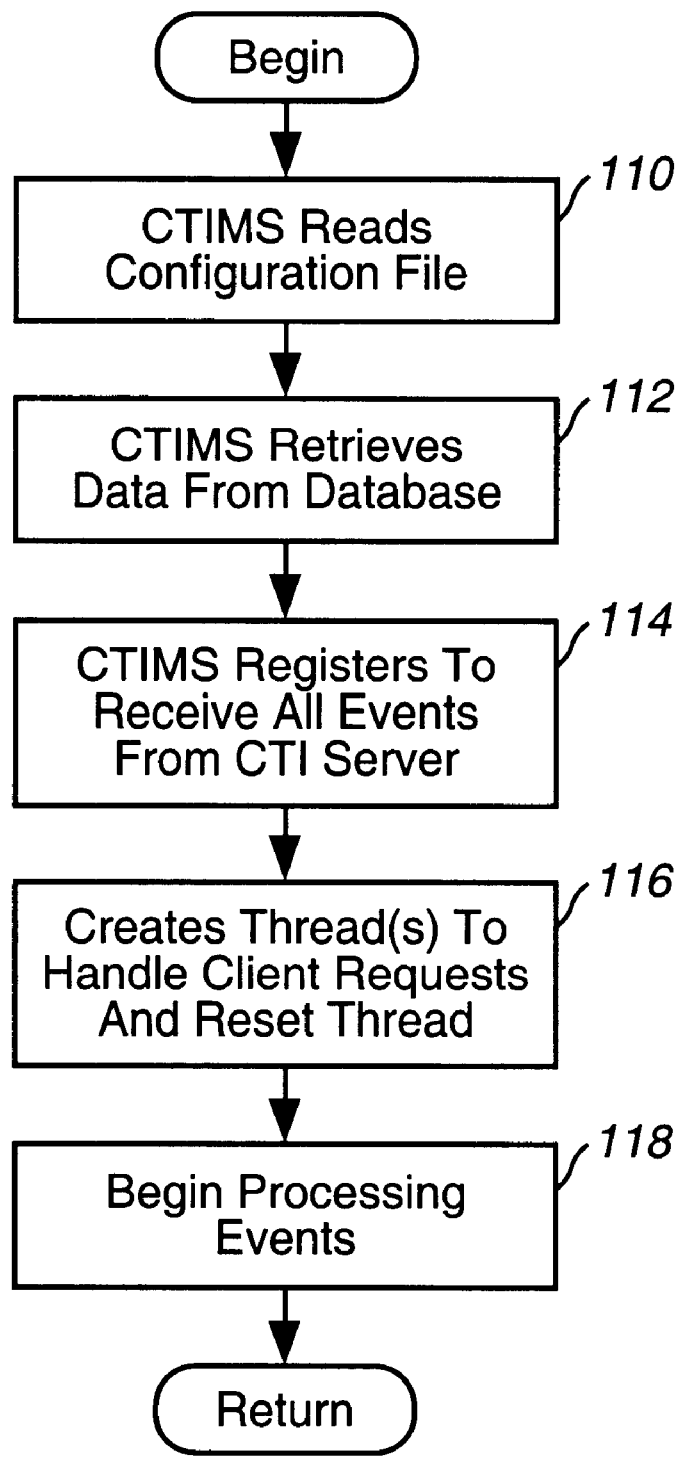
FIG. 6 is a flowchart illustrating the steps that are performed by CTIMS when it becomes active.

FIG. 6 is a flowchart illustrating the steps performed by CTIMS 36 when CTIMS initially becomes active. First, CTIMS 36 reads a configuration file (of the config object class 88) (see FIG. 4) (step 110 in FIG. 6). The configuration file is read to obtain various settings that are used by CTIMS 36. This configuration data may include hierarchy data that defines groupings. For example, the section [SOCKET] may have a read port ID and a write port ID. The grouping data may specify such information. CTIMS 36 retrieves data from the database in the ARMS 44 (step 112 in FIG. 6). This may include agent phone numbers, logical workstation numbers (LWNS), and the like. This information, along with events from the CTI server 30, helps CTIMS to build the relationships of agents to pad numbers, workstation numbers, and to identify what agents are servicing given business clients. CTIMS 36 then registers with the CTI server 30 for each LWN (step 114 in FIG. 6). IS module 92 spawns threads as needed (step 116 in FIG. 6). CTIMS 36 begins processing events received from the CTI server 30 and handling requests from the supervisor/control workstations 38 (step 118 in FIG. 6).

Figure 7:
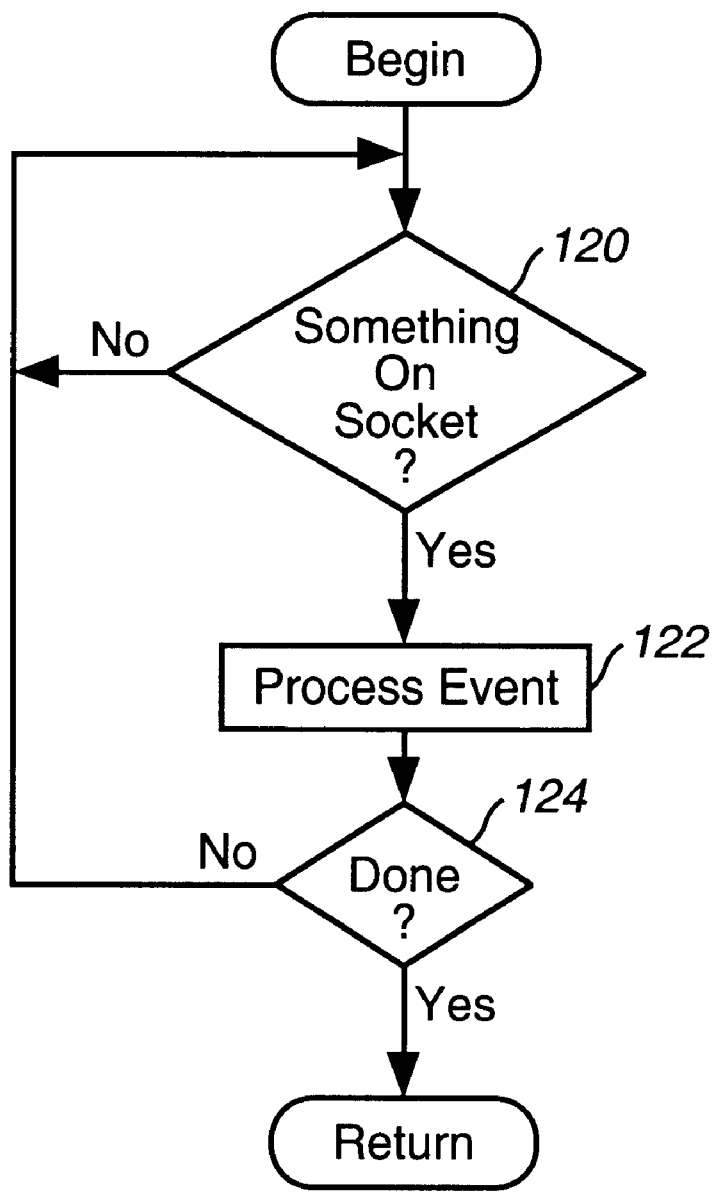
FIG. 7 is a flowchart illustrating the steps that are performed to process events received from the CTI server at CTIMS.

Once CTIMS 36 begins processing events, it largely operates in a loop-like fashion. FIG. 7 is a flowchart showing the steps that are performed for processing events received from the CTI server 30. CTIMS 36 looks to determine whether there is an event on the socket that is used for communications between the CTI server 30 and CTIMS (step 120 in FIG. 7). If there is an event on the socket, the event is processed (step 122 in FIG. 7). This is repeated until CTIMS 36 is done processing events (see step 124 in FIG. 7). It should be appreciated that the CTI server 30 and CTIMS 36 agree on dispatch functions that are to be used to dispatch TEvent structures. Specifically, a callback function is specified and used to dispatch messages when they are on the socket.

In order to get an appreciation for how the events are processed (see step 122 in FIG. 7), it is helpful to review the different types of events that are sent from the CTI server 30. FIG. 8 itemizes a number of the different event types that are relevant to the preferred embodiment of the present invention. The EventAgentLogin event type 128 reports that an agent has just logged onto an agent station 20. Conversely, the EventAgentLogout event type 130 indicates that an agent has logged out. These event types 128 and 130 are used by CTIMS to track agent login/logout times and duration of being logged in. The EventAgentReady event type 132 indicates that an agent has made the agent station ready for operation. The EventAgentNotReady event type 134 indicates that the agent is not ready for operation. The EventAgentBusy event type 136 indicates that the telephone set of the agent is done with a call but is still working on call data and the EventAgentNotBusy event type 138 indicates that the agent's telephone set is not currently busy.

The EventCallAbandonedQueue event type 140 indicates that there was no available agent to handle a call that was in the queue and, as a result, the caller opted to disconnect the call rather than waiting in the queue. This event type may be used by CTIMS 36 in calculating abandoned calls. The EventCallEnteredQueue event type 142 indicates that a call has entered the queue but has not yet been reached by an agent. The EventCallForwardCancel event type 144 indicates that call forwarding for a given phone number has been canceled. The EventCallForwardSet event type 146 indicates that calls to a particular telephone set are being forwarded. The EventUserEvent event type 148 indicates that a user event has occurred.

The EventConferenced event type 152 indicates that a call has been conferenced in with other calls at other locations. The EventDestinationBusy event type 154 indicates that the destination of a call is currently busy. The EventDialing event type 156 indicates that a call is being dialed. The EventAddressFreed event type 157 indicates that the allocated memory for an address is freed. The EventAttachedDataChanged event type indicates that attached data for a call has changed. The EventError event type 160 indicates that an error has occurred. This event type is used in calculating error status information and agent state information. The EventEstablished event type 162 indicates that a call has been connected successfully. This message type indicates that a call has successfully reached an agent.

The EventOffHook event type 164 indicates that a telephone receiver is off the hook. The EventOnHook event type 166 indicates that a telephone receiver is on hook. The EventReleased event type 168 indicates that a call has been disconnected. This event type indicates the end of a call with an agent. The EventRetrieved event type 170 indicates that a call has been transferred or a conference has been retrieved. The EventRinging event type 172 indicates the arrival of a call on the ACD. The EventAddressAllocated event type 174 indicates that memory for a given address has been allocated. The EventRouteRequest event type 176 indicates a call was made using a special number, has reached an agent and is waiting to be routed. The EventServerDisconnected event type 178 indicates that a connection to a local server has been lost and the EventTransferred event type 180 indicates that a call is being transferred to another location.

The EvenMailBoxLogin event type 181 indicates that a user has logged into a mailbox. Conversely, the EventMailBoxLogOut event type 183 indicates that a user has logged out of a mailbox. The EventVoiceFileOpened event type 185 indicates that a user has opened a voice file in the user's mailbox, and the EventVoiceFileClosed event type 187 indicates that a user has closed a voice file in the user's mailbox.

The event types itemized in FIG. 8 are utilized to gather information regarding agent status and to develop statistics on CTIMS 36. The TEvent structure also holds additional information that is used by CTIMS 36. This additional information includes an agent ID that specifies the ACD ID for the call. This ACD ID refers to a telephone pad ID, which in turn may be associated with an agent. The TEvent structure may also include an ANI attribute that holds a pointer to Automatic Number Identification Service digits for the current call. Information regarding call type (such as inbound call, outbound call, internal call, or unknown call) may be provided within the TEvent structure. A DNIS attribute may be included in the TEvent structure that includes a pointer to an ASCII representation of the Dialed Number Identification Service digits for the current call. These DNIS values are associated with business clients so that CTIMS 36 knows the business client for which the call is being handled. The TEvent structure may also hold error code information and error message information.

As was mentioned above, CTIMS 36 maintains information about each agent in a respective agent object. The agent objects include attributes or data members and member functions for manipulating the data stored therein. FIGS. 9A and 9B list a number of the attributes 182 found within an agent object. Attribute 190 identifies the agent associated with the object. Attribute 192 holds an identifier of the supervisor of the agent. Attribute 200 holds state information regarding the agent. The agent state information in attribute 200 is used internally by CTIMS 36. The monitoring system State 202 specifies a state of the agent as utilized by the monitoring system client 51. This state may be one of the following states: Logout, Unknown, Error, Available, Unavailable, Call_Work, Inbound_Call, Outbound_Call, Internal_Call, Consult_Call, or Unknown_Call.

Attribute 204 holds an array of counts and specifies the number of inbound calls as indexed by business client.

Attribute 206 holds a call count specifying the number of calls processed by the agent. Attribute 208 holds an array of total number of calls as indexed by call type. Attribute 210 holds an indication of the call type currently being processed, and attribute 212 holds a business client code that identifies the business client for which a call is currently being processed. The OnCall attribute 214 holds a value that specifies a flag. The Pad attribute 216 holds a string of characters that identify the telephone pad the agent is utilizing.

Attribute 218 holds the login time for the agent, and attribute 220 holds the logout time for the agent. Attribute 222 specifies the time at which the last state change occurred. Attribute 224 holds the time at which a call was established with the agent and attribute 226 holds the time at which a call was released by the agent. Attribute 228 specifies the time at which the agent entered a ready state. Attribute 230 holds a time at which the agent entered an available state. Attribute 232 holds a time at which the agent entered an unavailable state.

Attribute 234 specifies the time at which an agent was on a call. Attribute 236 specifies the time during a call during which the agent the agent was working (i.e., not talking). Attribute 238 holds a time during which an agent was in an error state. Attribute 240 holds a time during which the agent was in an unknown state. Attribute 242 holds the current time and attribute 244 holds a reference time value. Attribute 246 holds a time during which the time settings are to be reset. Attribute 248 holds a string regarding the time at which a state change occurred.

Attribute 250 holds a value in seconds of total login time for the agent. Attribute 252 holds a value that specifies the total time in seconds in which the agent has been in the available state. Attribute 254 holds a value equal to the total time in seconds in which the agent has been in an unavailable state. Attribute 256 holds a value in seconds that specifies the total time in which the agent has been on call. Attribute 258 holds an array wherein each entry holds a total value in seconds in which the agent has been on an inbound call for a given business client. Attribute 260 holds a value in seconds equal to the total time in which the agent has been on an outbound call. Attribute 262 holds a value in seconds equal to the total time in which the agent has been on an internal call. Attribute 264 (see FIG. 9B) holds the total time in seconds in which the agent has been on a consulting call. Attribute 266 holds a value in seconds equal to the total time in which the agent has been on an unknown call.

Attribute 268 holds a value equal to the total time in seconds in which the agent has been working on a call. Attribute 270 holds a value equal to the total time in seconds in which the agent has been in an error state. Attribute 272 holds a value equal to the total time in seconds in which the agent has been in an unknown state. Attribute 274 holds a value equal to the talk time of a current call. Attribute 276 holds an array that specifies the total talk time by the agent for calls indexed by business client. Attribute 278 holds an array of values that specify the average talking time indexed by call type. Attribute 280 holds the average talk time by the agent for all calls processed by the agent. Attribute 282 holds the average working time for all calls processed by an agent, and attribute 284 holds the average handling time for all calls handled by an agent.

Attribute 286 holds a value equal to the number of ghost calls received by the agent. Attribute 288 holds a value equal to the number of hang-ups on the agent. Attribute 290 holds a value equal to the total number of calls handled by the agent. Attribute 292 holds an array of entries indexed by business client that specify the number of inbound calls handled by the agent for the associated business client. Attribute 294 holds a value equal to the total number of outbound calls handled by the agent, and attribute 296 holds a value equal to the total number of internal calls handled by the agent. Attribute 298 holds a value equal to the number of consulting calls handled by the agent and attribute 300 holds a value equal to the number of unknown calls handled by the agent. Attribute 302 holds information regarding skills possessed by an agent and attribute 304 holds a NewAgent attribute.

Each agent object also includes member functions for obtaining and maintaining the attributes discussed above.

Figure 10:
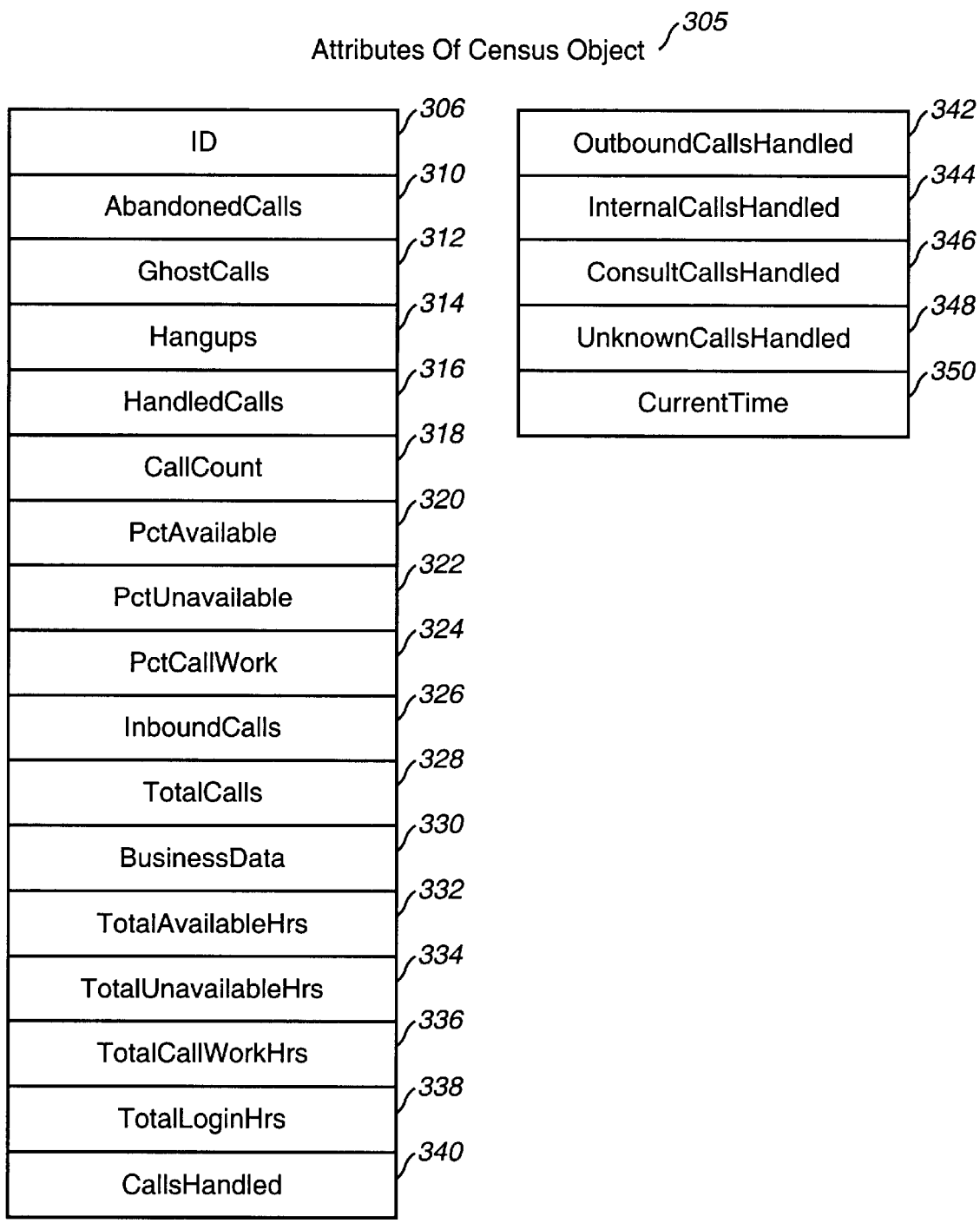
FIG. 10 lists attributes of a center object that are used in the preferred embodiment of the present invention.

In order to gain appreciation for the information and statistics that are maintained by CTIMS 36 for a call center 10, it is helpful to review attributes 305 of a center object. FIG. 10 depicts such attributes. Attribute 306 holds an ID that identifies the call center associated with the object. Attribute 310 holds a value that specifies the number of abandoned calls that occurred since the last reset. Attribute 312 holds a value that identifies the number of ghost calls for the call center since the last reset. Attribute 314 holds a value specifying the number of hang-ups since the last reset. Attribute 316 holds a value that specifies the number of calls that have been handled by the call center since the last reset, and attribute 318 holds a total call count for the call center since the last reset.

Attribute 320 specifies the percentage of agents that are available and attribute 322 holds a value that specifies the percentage of agents that are unavailable. Attribute 324 specifies a percentage of agents that are currently working on calls. Attribute 326 holds a value specifying the number of inbound calls received by the call center and attribute 328 specifies the total calls for the call center. Attribute 330 specifies business data.

Attribute 332 specifies the total time in hours in which agents have been available and attribute 334 specifies the total time in hours in which agents have been unavailable. Attribute 336 specifies in hours the total time in which agents have been working on calls and attribute 338 specifies the total time in hours in which agents have been logged in. Attribute 340 holds a value that indicates the number of calls that have been handled. Attribute 342 holds a value that specifies the number of outbound calls that have been handled. Attribute 344 holds a value that specifies the number of internal calls that have been handled. Attribute 346 holds a value that indicates the number of consulting calls that have been handled and attribute 348 specifies the number of unknown calls that have been handled. Lastly, attribute 350 holds the current time.

Figure 11:
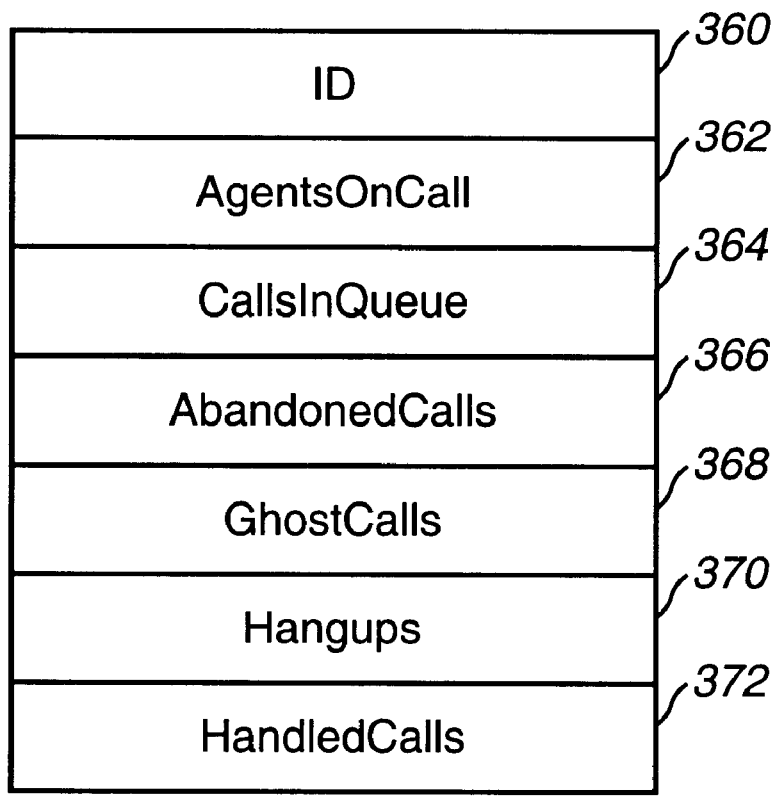
FIG. 11 lists attributes of a business object that are used by the preferred embodiment of the present invention.

CTIMS 36 also maintains business statistics and stores much of this information within business objects that are created for respective business clients. FIG. 11 depicts the attributes 359 of such a business object. Attribute 360 holds an ID that identifies the business client and attribute 362 specifies the number of agents that are currently on calls for the business client. Attribute 364 holds a value that indicates the number of calls that are currently in a queue for the business client and attribute 366 holds a value that identifies the number of calls that have abandoned for the client. The number of ghost calls for the client is held in attribute 368. Attribute 370 holds the number of hang-ups for the client. Lastly, attribute 372 holds the number of calls that have been handled for the client.

Figure 12A:
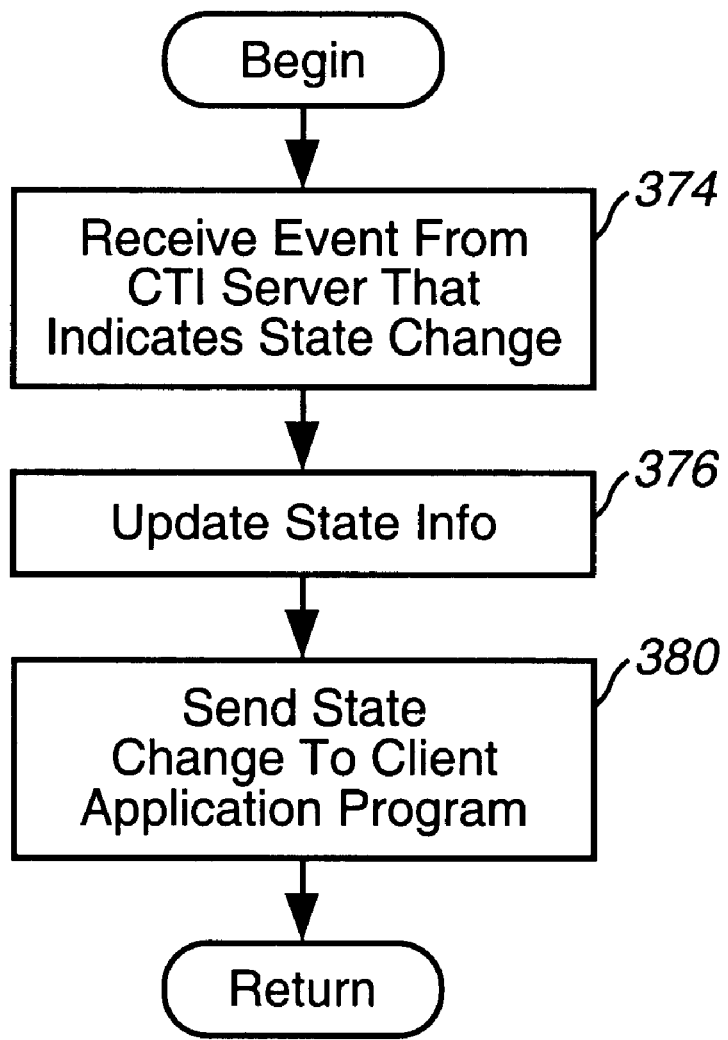
FIG. 12A is a flowchart illustrating the steps that are performed to send state changes to a client application program from CTIMS.

Once CTIMS 36 has calculated the statistics and updated the state information, this information may be obtained by the monitoring system client 51. FIG. 11A is a flowchart illustrating the steps that are performed in sending state change information to the client application program. Specifically, CTIMS 36 receives an event from the CTI server 30 that indicates that a state change has occurred (step 374 in FIG. 12A). CTIMS 36 then updates the state information it maintains internally (step 376 in FIG. 12A). A state change event or message is then sent to the client application program over the designated socket (step 380 in FIG. 12A).

Figure 12B:
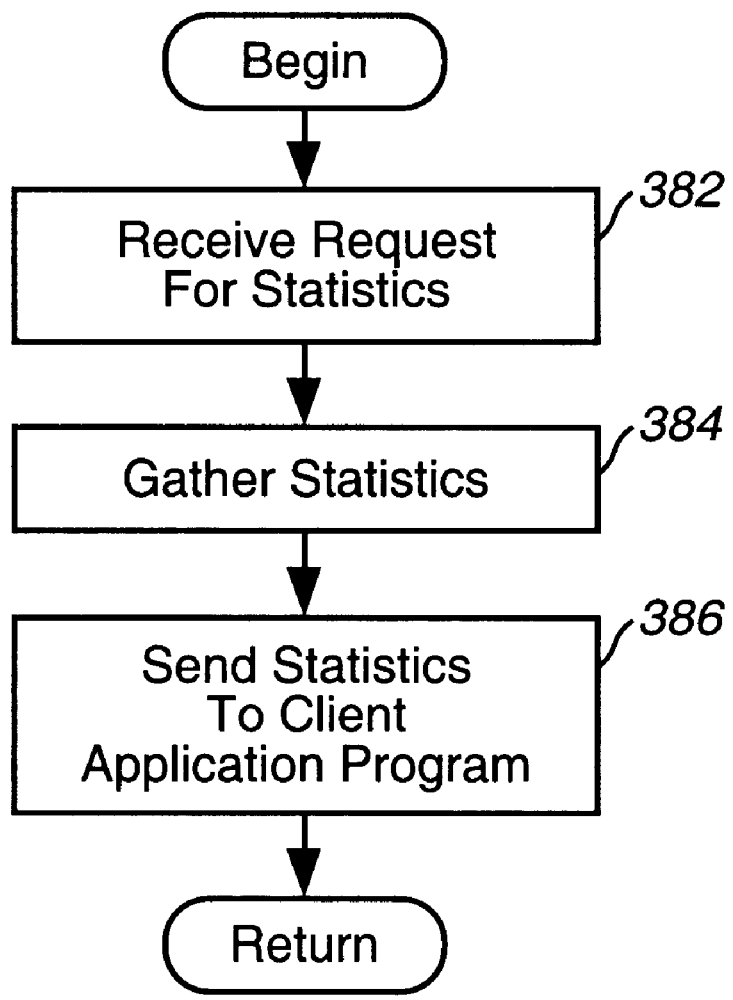
FIG. 12B is a flowchart that illustrates the steps that are performed to provide statistics to a client application program from CTIMS.

CTIMS 36 may also send statistics to the monitoring system client 51. As was mentioned above, the monitoring system client 51 polls CTIMS 36 for such statistics. The process begins when the client application program sends a request that is received at CTIMS 36 for statistics (step 382 in FIG. 12B). The requested statistics have been gathered by CTIMS from the objects that it maintains (step 384 in FIG. 12B). The statistics are then sent to the client application program (step 386 in FIG. 12B).

The monitoring system client 51 generates a GUI that depicts a portion or all of the call center. The physical layout for the call center is known to the monitoring system client 51. The monitoring system client 51 is also aware of what agents are currently processing calls in the call center and where the agents are stationed based upon information retrieved from the ARMS 44. The monitoring system client 51 also has statistical information regarding agents, supervisors and business segments. This information is utilized by the monitoring system client 51 to display appropriate information in the GUI.

The GUI generated by the monitoring system client 51 may display a number of different views. The call center is composed of a number of bays. Each bay includes two pods, and each pod includes a number of agent stations. The GUI may display an entire call center view, a bay view, or a pod view. Each of these views displays different respective portions of the call center. These views allow a supervisor to look at the entire call center or to focus on particular portions of the call center that are of interest.

Figure 13:
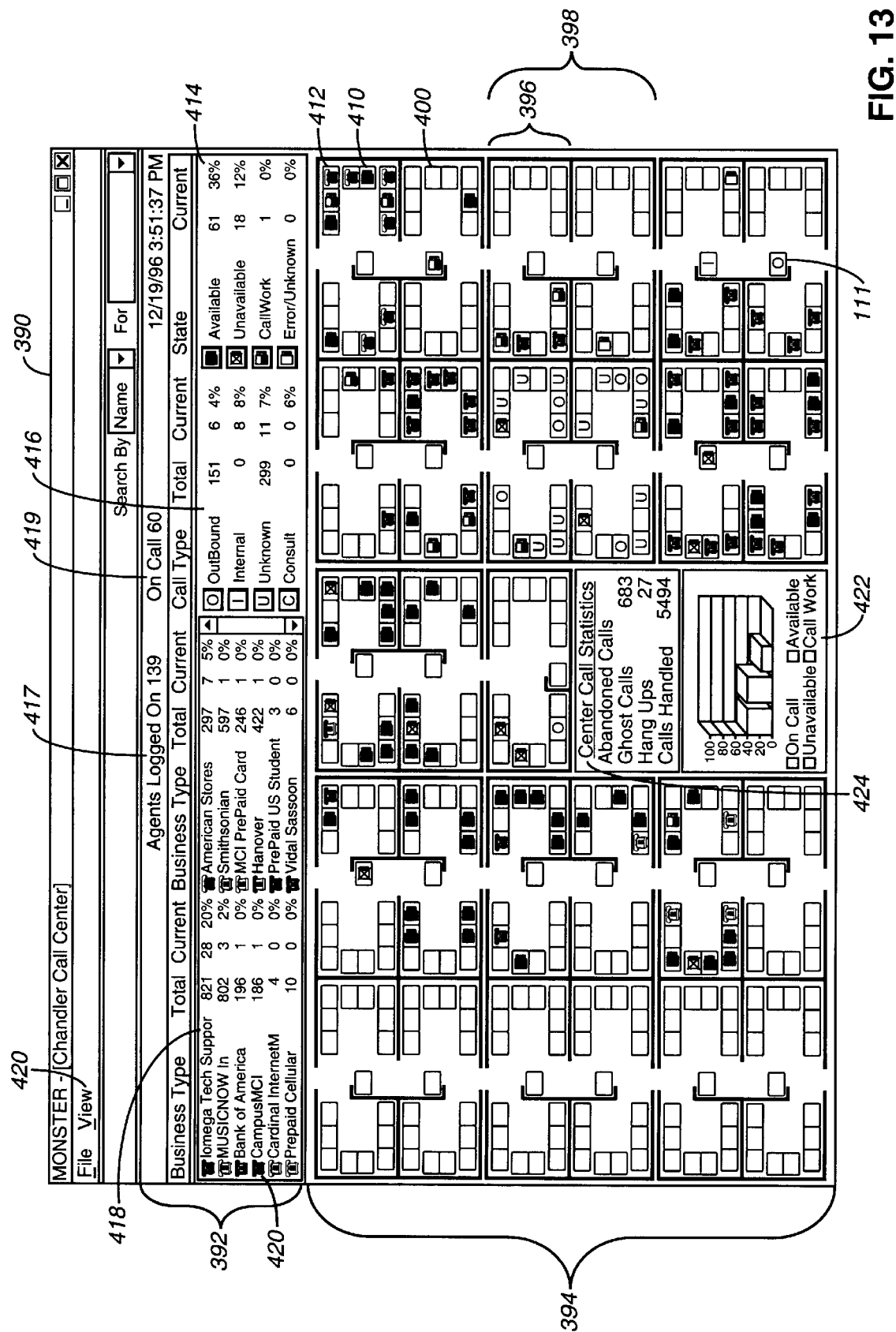
FIG. 13 shows a screen shot of a window produced by the monitoring system client that contains a complete call center view.

FIG. 13 depicts an example window 390 that is generated by the monitoring system client 51. The window 390 includes a statistics section 392 that displays statistics regarding calling activity and a call center section 394 that has a graphic layout modeling the physical layout of the call center. Agent stations are depicted as rectangular buttons 400 in FIG. 13. Each button may display an icon that indicates the agent state, call type or business type. For example, rectangle 410 holds an icon that provides a visual cue that the agent is unavailable. Rectangle 411 holds a letter (e.g., "O") that indicates that an outbound call is being processed by the agent at the associated agent station. Rectangle 412 holds an icon that indicates that the business client for which the agent is servicing a call. In general, if an agent is in the available state, the unavailable state or the error/unknown state, the icon associated with that state is displayed in the rectangle associated with the agent. If the agent is placing an outbound call, an internal call or an unknown call, the letter associated with that type of call is displayed in the rectangle for the agent. If the agent is processing a call that is associated with a given business, the icon for the business will be displayed in the rectangle for the agent. Those skilled in the art will appreciate that other types of activatable user interface elements, other than buttons, may be used to depict agent stations.

The statistics section 392 of the window 390 holds various statistics regarding calling activity within the current view. The state table 414 of the statistics section 392 specifies the number of agents that are currently available, unavailable, processing calls or in an error or unknown state. The percentage of these totals is also displayed. The call type area 416 displays statistics by call type. The number of outbound calls, the number of inbound calls, the number of unknown calls and the number of consulting calls are all totaled and displayed within the call type area 416.

The business type area 418 of the statistics section 392 displays information regarding calls by business type. The icon associated with the business client and the name of the business client are displayed along with the total number of calls processed for the business, the current number of calls being processed for the business and percentages.

Summary statistics may also be displayed in the statistics section 392. For example, statistics 417 regarding the number of agents currently logged on in the call center and statistics 419 indicating the number of agents that are currently processing calls may be displayed.

Window 390 may also include a section 424 that holds call center statistics such as the number of abandoned calls, the number of ghost calls, the number of hang-ups and the number of calls handled. Graphical information 422 may also be displayed that shows the percentage of agents that are either on call, unavailable or available.

The window 390 includes a menu bar that holds an entry 420 to access a view menu. The view menu enables a user to alter the view displayed within the window 390. As will be described in more detail below, the user may request the displaying of a call center view, a bay view, a pod view or a supervisor view.

The monitoring system client 51 also enables certain pop-up windows to be displayed. One of these pop-up windows is a window regarding information that is particular to a given business client. If a user positions a mouse cursor over the entry for the business type within the statistic section 392 and clicks, a pop-up window for the business client is displayed. FIG. 14 shows an example of such a pop-up window 426. The pop-up window 426 holds information that identifies the business client and holds summary statistics regarding calls processed for that business type. These summary statistics may include the number of agents on call for the business, calls in the queue that are waiting for an agent, abandoned calls, ghost calls, hang-up calls, handled calls and available agents.

As was mentioned above, a user may activate the view menu to change to the view displayed within the window 390. The user may also change the view by positioning a mouse cursor at locations within a section of the view displayed within the window 390 and clicking a mouse button. FIG. 15 identifies the hot spots within the depiction of the call center that may be used to change the view from a call center view to a bay view or a pod view. FIG. 15 shows the depiction of a bay 432 and indicates that positioning a mouse cursor in proximity to the area pointed to by arrow 434 and clicking results in a bay view being displayed within the window 390. If, however, a user positions a mouse cursor to point to the hot spots indicated by arrows 436A or 436B and clicks, a pod view for the pod associated with a respective hot spot is displayed within the window 390.

Figure 16:
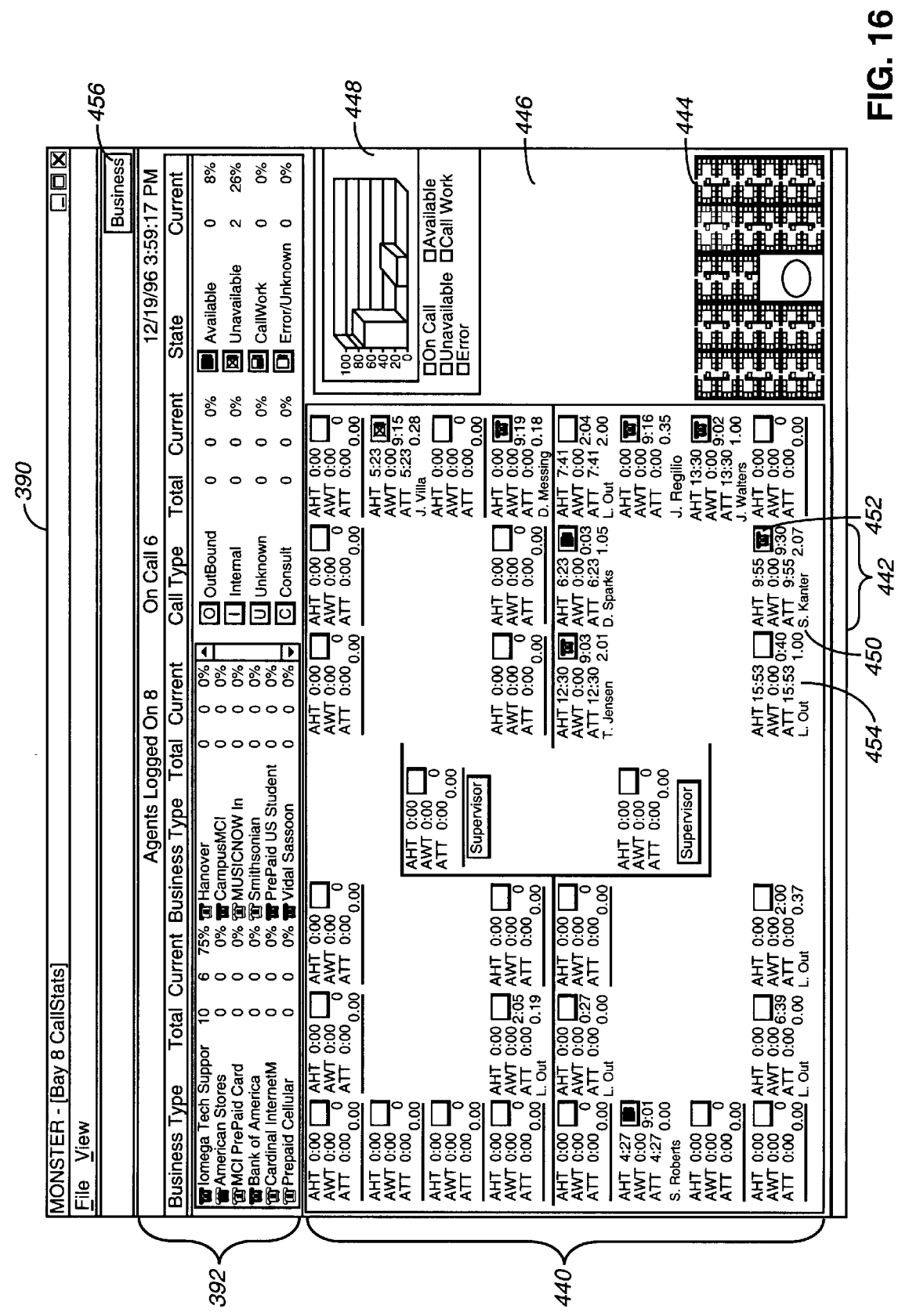

FIG. 16 shows an example of a bay view. The bay view may either hold statistical information or business client information. In FIG. 16, the bay view holds statistical information. As can be seen in FIG. 16, the entire call center layout is not displayed within the window 390 but rather only a single bay 440 is depicted within the window 390. The statistics section 392 holds information only as to activity relative to the bay that is shown. Information 442 regarding each agent within the bay is shown. This information includes the name 450 of the agent and an icon 452 on a button that indicates either the state of the agent, the call type or the business type. This icon is like that found for agents in the call center view. A set of statistics 454 is also displayed for each agent. The statistics include the average handling time (AHT), which specifies the time it takes on average for an agent to handle (i.e., fully process) a call. The statistics 454 also include the average work time (AWT), which identifies the time at which the agent is processing the call but not talking, and the average talk time (ATT), which specifies the average amount of time that the agent is talking on a call. The AHT is the sum of the AWT and ATT.

Graphical data 448 depicting the percentage of agents that are on call, unavailable, available or in an error state is depicted within the bay view. The bay view also includes a condensed view 444 of the call center. The bay 446 currently being displayed is highlighted in the condensed view 444 to indicate position of the bay within the call center. A "Business" button 456 may be displayed and activated to change the view to show business segment information for the bay rather than call statistics for the bay.

Figure 17:
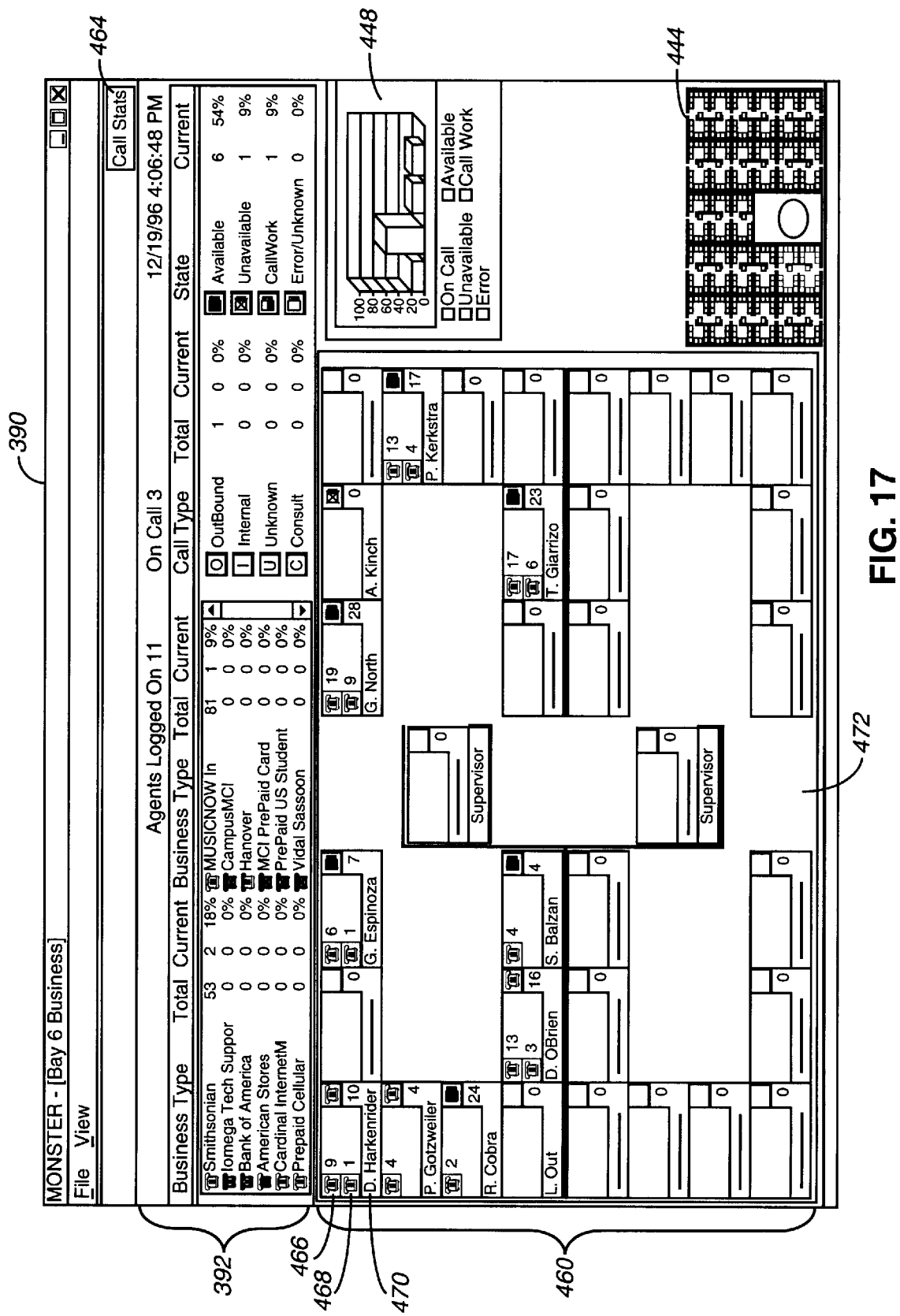
FIG. 17 is a screen shot that depicts a window produced by the monitoring system client where business client information is displayed that contains call statistics.

FIG. 17 depicts an example of an instance wherein the business client information is shown for a bay view. Graphical data 448 and a condensed view 444 of the call center layout are still displayed. Similarly, the statistics section 392 holds statistical information regarding calling activity for the bay. The information that is displayed per agent, however, differs. The name 470 of the agent is still displayed but only information regarding business clients is displayed. In particular, an icon identifying a business client and the associated number of calls that have been processed for the business client are displayed. For example, icon 466 is associated with the first business and the display shown in FIG. 17 indicates that nine calls have been processed by the given agent for that business. Icon 468 is associated with a different business and the display indicates that only a single call has been processed by the agent for that business. The window 390 may include a "CallStats" button 464 that may be activated to show call statistics information for the bay view rather than business client information.

Figure 18:
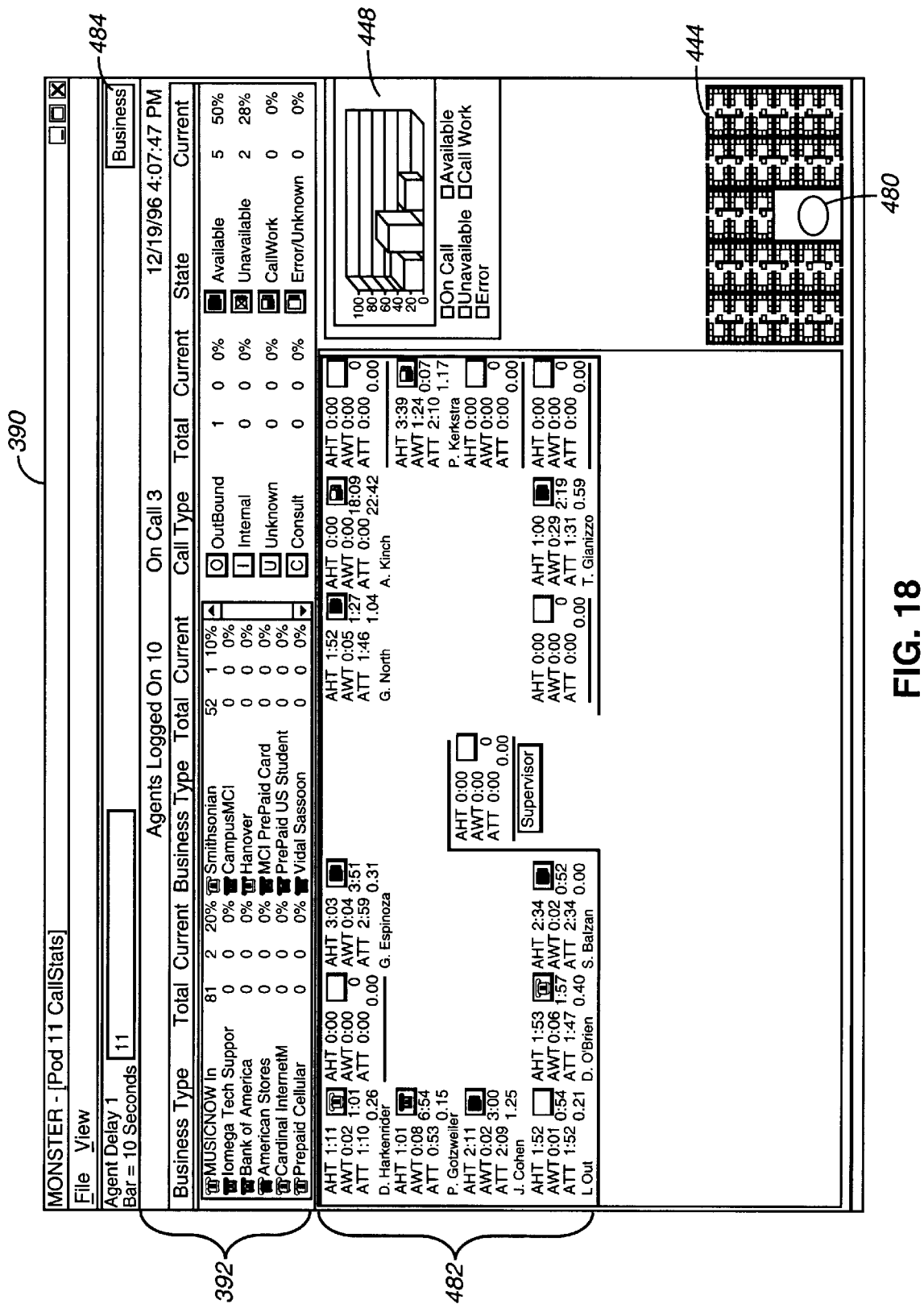
FIG. 18 is a screen shot that depicts a window produced by the monitoring system client that contains a pod view.

As was mentioned above, the view may also show only a single pod (i.e., half of a bay). FIG. 18 depicts an instance wherein a pod view for a pod 482 is displayed. The information is like that shown for the bay view but contains only information for the agents within the given pod. The statistics section 392 holds information for the pod and the graphical data 448 is for the pod. The condensed view 444 of the call center layout shows a highlighted section 480 that is associated with the pod. As in the bay view, a user may choose to show call statistics information or business client information for the agents. A "Business" button 484 may be activated to toggle to the business segment information for the pod.

Figure 19:
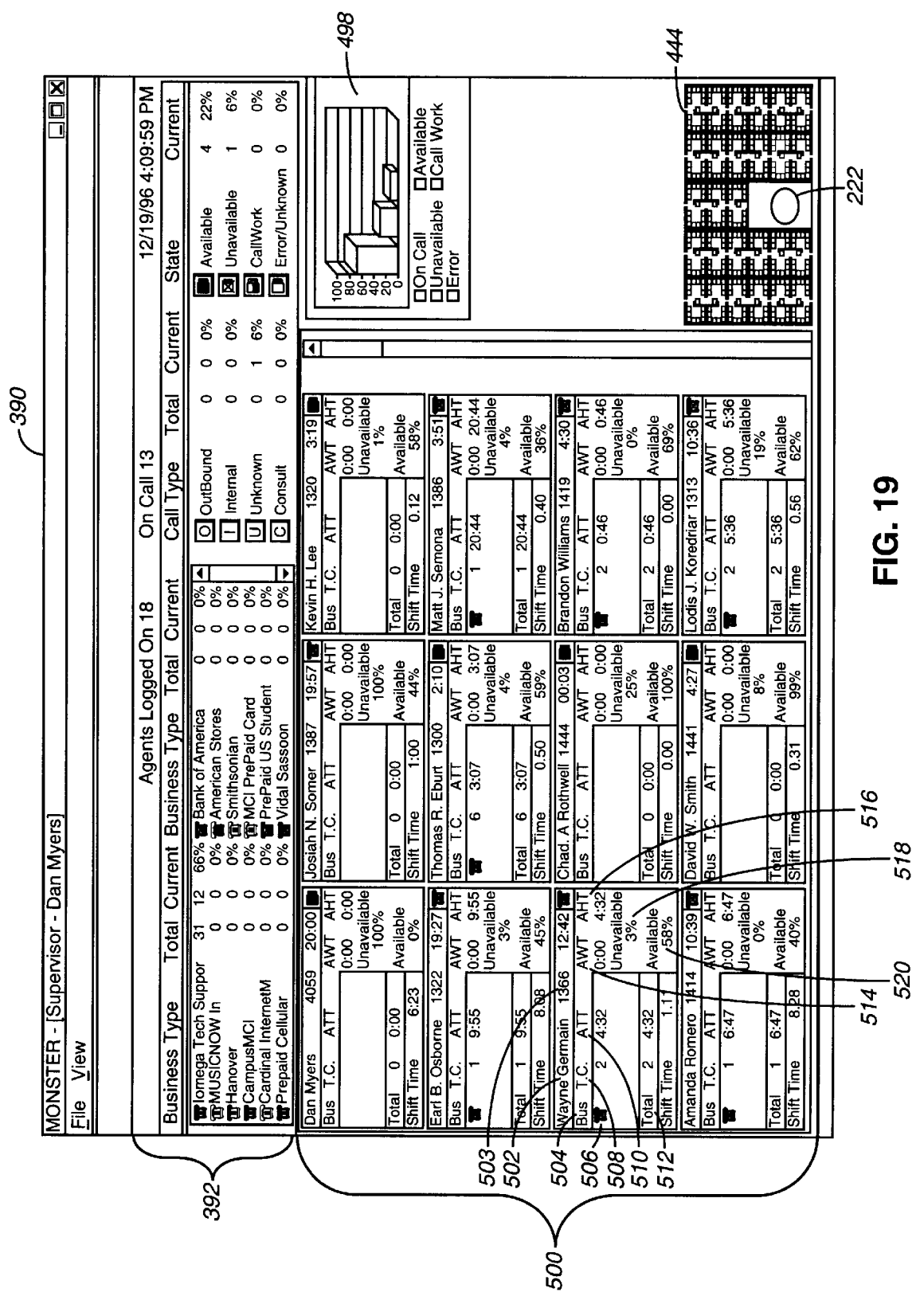

A supervisor view for a given supervisor may also be displayed (see FIG. 19). The supervisor view shows a statistic section 392 that holds statistics for the agents under the supervisor. A graphical section 500 shows statistics regarding each of the agents. The information includes the name 502 of the agent and a phone identifier 503 for the agent. A table of call information is displayed that includes a column 504 that may hold icons 506 for the given business client, a column 508 that identifies the total number of calls processed by the agent for the business and the average talk time (ATT) for the calls processed for the business. Totals 512 for the table are displayed as well. Statistics 514 regarding the average working time (AWT) are displayed along with statistics 516 for the average handling time (AHT). The percentage of time which the agent is unavailable 518 is displayed along with the percentage of time the agent is available 520.

Figure 20:
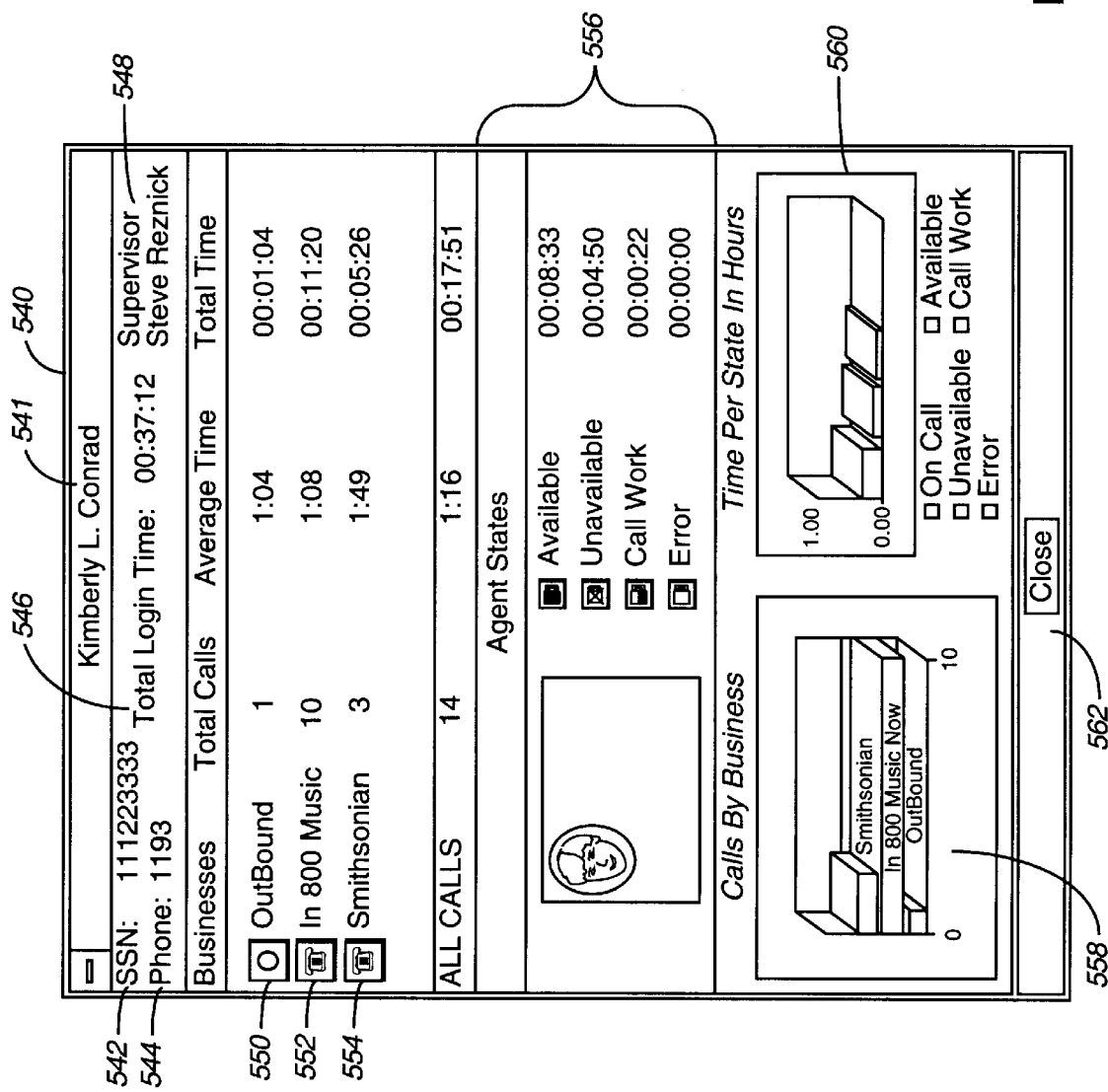
FIG. 20 depicts a pop-up window that displays agent information.

It should be appreciated that in any of the views, information regarding an agent may be obtained by positioning a mouse cursor over the button (i.e., rectangle) associated with an agent in the given view and activating the button by clicking a mouse button. FIG. 20 shows an example of an agent view window 540. The name 541 of the agent is displayed in the title bar of the window 540. The social security number 542 of the agent is displayed along with a phone identifier 544. The total time in which the agent has been logged in 546 is displayed. The name of a supervisor 548 is displayed as well. A table summarizing call processing for the agent by business segments is displayed. Each row 550, 552 and 554 holds information about the associated business segment. The total number of calls and the average time to handle a call are displayed within the associated row. The total amount of time spent on handling calls for the business are also displayed.

The window 540 includes a table 556 that summarizes how much time the agent has spent in a respective agent state. The window 540 also includes a graph 558 that shows the number of calls processed by the agent by business segment and a graph 560 that shows the time in which an agent has been in the respective agent states is included in the window 540. Lastly, a "Close" button 562 is provided to enable the pop-up window 540 to be closed.

The present invention has the benefit of enabling a supervisor or other party to view information regarding call processing activity within the call center. The supervisor may readily change the view as needed and information contained within the views is updated regularly to be ensured to be current. Moreover, the information is shown in a variety of different formats that are useful to a supervisor.

While the present invention has been described with reference to a preferred embodiment thereof, those skilled in the art will appreciate that various changes in form and detail may be made without departing from the intended scope of the present invention as defined in the appended claims. For example, the present invention need not be practiced in an object oriented environment, but rather may be practiced in other suitable environments. In addition, the user interface may differ from that depicted within the figures. The monitoring system client may run on an agent workstation or on other workstations that differ from the supervisor/control workstations. In fact, the monitoring system client may be run at a remote workstation outside of the call center.

What is claimed is:

1. A call center for handling calls for more than one business, comprising:

agent stations for agents, each agent station including telephony resources through which agents handle calls;

a monitor for monitoring calling activity of the agents and producing statistics regarding the calling activity of the agents;

a computer system having a display device and running a program for obtaining the statistics from the monitor via periodic polling and displaying the statistics on the display device, wherein the computer system displays at least one statistic specific to a subset of the businesses handled by the call center.

2. The call center of claim 1, further comprising an event source for generating events regarding calls handled by the call center for forwarding the events to the monitor that uses the events in producing the statistics.

3. The call center of claim 1, further comprising a database for storing information regarding the agents.

4. The call center of claim 1 wherein the computer system produces a graphical user interface and the statistics are displayed as part of the graphical user interface.

5. The call center of claim 1 wherein the monitor is a server process and the program run on the client is a server process.

6. The call center of claim 1 wherein the monitor includes an agent module for producing statistics regarding calling activity of the agents.

7. The call center of claim 1 wherein the monitor includes a call center module for producing statistics regarding calling activity of all the agents in the call center.

8. The call center of claim 1 wherein the call center includes business clients that use the call center to handle calls on their behalf and wherein the monitor includes a business client module for generating statistics regarding calling activity on behalf of the business client.

9. The call center of claim 1, wherein said statistics include an average work time which identifies the time at which the agent is processing the call but not talking.

10. The call center of claim 1, wherein said statistics include an average talk time which identifies the time at which the agent is talking on the call.

11. The call center of claim 1, wherein said statistics include a business client code that identifies the business client for which a call is being processed.

12. In a call center having agents who handle calls for more than one business and a computer system having a display device, a method comprising the computer implemented steps of:

provi ding a monitor for monitoring calling activity by the agents and gathering statistics regarding the calling activity of the agents;

with the monitor, gathering statistics regarding the calling activity of the agents;

passing the statistics to an application program running on the computer system based on periodic polling; and with the application program, displaying the statistics on the display device, wherein the displayed statistics comprise at least one statistic pertaining to a subset of the businesses handled by said call center.

13. The method of claim 12 wherein the statistics are displayed as part of a graphical user interface produced by the application program.

14. The method of claim 13 wherein the call center has a physical layout and wherein the graphical user interface depicts the physical layout of at least a portion of the call center.

15. The method of claim 14 wherein the graphical user interface depicts the layout of all of the call center.

16. The method of claim 12 wherein the monitor also maintains state information about the agents in the call center.

17. The method of claim 16, further comprising the steps of:

passing the state information about the agents from the monitor to the application program;

displaying a visual cue about a state of at least one of the agents on the display device based on the state information passed from the monitor.

18. The method of claim 12 wherein the monitor is a server process and the application program is a client process.

19. The method of claim 12 wherein the call center further includes an event source for generating events regarding calls handled by the call center and for forwarding the events to the monitor to facilitate the monitor generating the statistics.

20. The method of claim 12 wherein the statistics include statistics regarding calling activity of each of the agents.

21. The method of claim 12 wherein the statistics include aggregate statistics regarding the calling activity of all of the agents in the call center.

22. The call center of claim 12, wherein said statistics include an average work time which identifies the time at which the agent is processing the call but not talking.

23. The call center of claim 12, wherein said statistics include an average talk time which identifies the time at which the agent is talking on the call.

24. The call center of claim 12, wherein said statistics include a business client code that identifies the business client for which a call is being processed.

25. A telecommunications system for handling call for more than one business, comprising:

agent stations where agents are stationed to handle calls, each agent station including telephony resources for handling calls;

a switching mechanism for routing calls for the telecommunications system and generating raw data regarding calls;

a computer/telephony integration server for receiving the raw data from the switching mechanism and generating events about calling activity in the telecommunications system based on the raw data;

a monitoring server for receiving the events from the computer/telephony integration server and generating statistics regarding calling activity of the agents; and a workstation running a program for acquiring the statistics from the monitoring server via periodic polling and generating output that includes at least some of the statistics, wherein the statistics comprise at least one statistic pertaining to a subset of the businesses handled by said agents.

26. The telecommunications system of claim 25 wherein the system includes a display device and the program running on the workstation displays at least some of the statistics on the display device.

27. The telecommunications system of claim 26 wherein the program produces a graphical user interface on the display device and the displayed statistics are displayed as part of the graphical user interface.

28. The telecommunications system of claim 25 wherein the program includes a polling mechanism for periodically polling the monitoring server for updated statistics regarding calling activity of the agents.

29. The call center of claim 25, wherein said statistics include an average work time which identifies the time at which the agent is processing the call but not talking.

30. The call center of claim 25, wherein said statistics include an average talk time which identifies the time at which the agent is talking on the call.

31. The call center of claim 25, wherein said statistics include a business client code that identifies the business client for which a call is being processed.

32. In a call center having agents who handle calls for more than one business and a computer system having a display device, a computer-readable medium holding computer-executable instructions for performing a method comprising the computer-implemented steps of:

providing a monitor for monitoring calling activity by the agents and gathering statistics regarding the calling activity of the agents;

with the monitor, gathering statistics regarding the calling activity of the agents;

passing the statistics to an application program running on the computer system in response to periodic polling; and with the application program, displaying the statistics on the display device, wherein the displayed statistics comprise at least one statistic pertaining to a subset of the businesses handled by said call center.

33. The computer-readable medium of claim 32 wherein the statistics are displayed as part of a graphical user interface produced by the application program.

34. The computer-readable medium of claim 33 wherein the call center has a physical layout and wherein the graphical user interface depicts the physical layout of at least a portion of the call center.

35. The computer-readable medium of claim 34 wherein the monitor also maintains state information about the agents in the call center.

36. The computer-readable medium of claim 32 wherein the monitor also maintains state information about the agents in the call center.

37. The computer-readable medium of claim 36 wherein the method further comprises the steps of:

passing the state information about the agents from the monitor to the application program;

displaying a visual cue about a state of at least one of the agents on the display device based on the state information passed from the monitor.

38. The computer-readable medium of claim 36 wherein the statistics include statistics regarding calling activity of each of the agents.

39. The computer-readable medium of claim 32 wherein the statistics include aggregate statistics regarding the calling activity of all of the agents in the call center.

40. The call center of claim 32 wherein said statistics include an average work time which identifies the time at which the agent is processing the call but not talking.

41. The call center of claim 32, wherein said statistics include an average talk time which identifies the time at which the agent is talking on the call.

42. The call center of claim 32, wherein said statistics include a business client code that identifies the business client for which a call is being processed.

43. a call center having agents who handle calls on behalf of business clients, a computer-readable medium holding computer-executable instructions for performing a method practiced in a computer system, comprising the computer-implemented steps of:

providing a monitor for monitoring calling activity by the agents and gathering information for generating statistics regarding the calling activity of the agents;

gathering and generating statistics regarding the calling activity of the agents that summarize calling activity per business client, wherein the statistics include a business client code that identifies the business client for which a call is being processed; and passing the statistics to a device in response to a polling signal received from the device.

44. A computer system for monitoring calling activity by agents in a call center that handles calls on behalf of business clients, said call center having a computer telephony/integration server for generating events about calling activity in the call center and an application program, comprising:

an interface for receiving events generated by the computer/telephony integration server;

a statistics generator configured to gather and generate statistics regarding the calling activity by agents in the call center on a per business client basis, wherein the statistics include a business client code that identifies the business client for which a call is being processed; and an interface to the application program for passing statistics generated by the statistics generator to the application program in response to periodic polling.

45. In a call center having agents who handle calls for more than one business and a computer system having a display device, a method comprising the computer implemented steps of:

monitoring calling activity by the agents;

gathering statistics regarding the calling activity of the agents based on the monitoring;

periodically passing the statistics to an application program running on the computer system in response to a polling signal; and displaying, via the application program, the statistics on the display device, the displayed statistics comprising at least one statistic pertaining to a subset of the businesses handled by the call center.

* * * * *